US012725753B2

(12) United States Patent
Nair et al.

(10) Patent No.: US 12,725,753 B2
(45) Date of Patent: Sep. 1, 2026

(54) FORCED OIL CIRCULATION IN X-RAY TUBE WITHOUT EXTERNAL HOSES

(71) Applicant: GE Precision Healthcare LLC, Waukesha, WI (US)

(72) Inventors: Anup G. Nair, Bengaluru (IN); John J. McCabe, West Milwaukee, WI (US); Carey S. Rogers, West Milwaukee, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 72 days.

(21) Appl. No.: 18/664,047

(22) Filed: May 14, 2024

(65) Prior Publication Data

US 2025/0299901 A1 Sep. 25, 2025

(30) Foreign Application Priority Data

Mar. 19, 2024 (IN) ............................. 202441020352

(51) Int. Cl.
*H01J 35/16* (2006.01)
*H05G 1/02* (2006.01)

(52) U.S. Cl.
CPC ....... *H01J 35/16* (2013.01); *H01J 2235/1275* (2013.01); *H01J 2235/1283* (2013.01); *H01J 2235/1291* (2013.01); *H01J 2235/163* (2013.01); *H05G 1/025* (2013.01)

(58) Field of Classification Search
CPC ....................................................... H01J 35/16
See application file for complete search history.

(56) References Cited

U.S. PATENT DOCUMENTS

| | | | | | |
|---|---|---|---|---|---|
| 4,866,743 | A * | 9/1989 | Kroener | A61B 6/035 | 378/4 |
| 6,453,010 | B1 * | 9/2002 | Miller | H05G 1/025 | 378/127 |
| 7,203,282 | B2 | 4/2007 | Brauss | | |
| 7,280,638 | B1 | 10/2007 | Weaver et al. | | |

(Continued)

FOREIGN PATENT DOCUMENTS

| | | | |
|---|---|---|---|
| DE | 886638 | C | 8/1953 |
| JP | S5830054 | A | 2/1983 |

(Continued)

OTHER PUBLICATIONS

EP application 25159598.9 filed Feb. 24, 2025—partial Search Report issued Aug. 25, 2025; 15 pages.

(Continued)

*Primary Examiner* — Hugh Maupin
(74) *Attorney, Agent, or Firm* — McCoy Russell LLP

(57) ABSTRACT

An X-ray tube housing is disclosed that has oil channels integrated (e.g., built into) the X-ray tube housing that accommodate a flow of oil through interior spaces of the X-ray tube housing. A first oil channel from a mid-casing portion of the X-ray tube housing to a pump housing inlet is built into the mid-casing portion, and a second oil channel from a pump housing outlet to a heat exchanger located in an anode-side casing is built into the anode-side casing. The integrated oil channels reduce a number of sealing joints, which reduces the opportunities for leaks, and allows an X-ray tube assembly to be assembled with fewer parts.

19 Claims, 14 Drawing Sheets

(56) References Cited

U.S. PATENT DOCUMENTS

| | | | | |
|---|---|---|---|---|
| 8,090,075 | B2 | 1/2012 | Holm et al. | |
| 9,420,676 | B2 | 8/2016 | Chen et al. | |
| 9,648,710 | B2 | 5/2017 | Smith et al. | |
| 10,512,146 | B2 | 12/2019 | Rogers et al. | |
| 10,806,014 | B2 | 10/2020 | Rogers et al. | |
| 2004/0202282 | A1 | 10/2004 | Miller | |
| 2004/0234041 | A1 | 11/2004 | Artig et al. | |
| 2006/0146985 | A1 | 7/2006 | Deutscher et al. | |
| 2007/0098144 | A1 | 5/2007 | Zhang et al. | |
| 2008/0043919 | A1 | 2/2008 | Chapin et al. | |
| 2015/0103978 | A1 | 4/2015 | Chan | |
| 2015/0139406 | A1 | 5/2015 | Hansen et al. | |
| 2016/0029468 | A1 | 1/2016 | Anno et al. | |
| 2017/0018393 | A1 | 1/2017 | Kuth et al. | |
| 2021/0029809 | A1* | 1/2021 | Ishii | H05G 1/26 |

FOREIGN PATENT DOCUMENTS

| | | | |
|---|---|---|---|
| JP | 2001223097 | A | 8/2001 |
| WO | 2023242792 | W | 12/2023 |

OTHER PUBLICATIONS

EP application 25159598.9 filed Feb. 24, 2025—extended Search Report issued Apr. 9, 2026; 17 pages.

* cited by examiner

FORCED OIL CIRCULATION IN X-RAY TUBE WITHOUT EXTERNAL HOSES

CROSS REFERENCE TO RELATED APPLICATIONS

The present application claims priority to Indian Patent Application number 202441020352, entitled "FORCED OIL CIRCULATION IN X-RAY TUBE WITHOUT EXTERNAL HOSES", and filed on Mar. 19, 2024. The entire contents of the above-listed application is hereby incorporated by reference for all purposes.

TECHNICAL FIELD

Embodiments of the subject matter disclosed herein relate to X-ray tubes, and in particular, to a casing of an X-ray tube.

BACKGROUND

X-ray systems may include an X-ray tube, a detector, and a support structure for the X-ray tube and the detector. In operation, an imaging table, on which an object is positioned, may be located between the X-ray tube and the detector. The X-ray tube typically emits radiation, such as X-rays, toward the object. The radiation passes through the object on the imaging table and impinges on the detector. As radiation passes through the object, internal structures of the object cause spatial variances in the radiation received at the detector. The detector then transmits data received, and the system translates the radiation variances into an image, which may be used to evaluate the internal structure of the object. The object may include, but is not limited to, a patient in a medical imaging procedure or an inanimate object, as in, for instance, a package in an X-ray scanner or computed tomography (CT) package scanner.

An X-ray tube assembly may include an X-ray tube insert, which may be enclosed in an X-ray tube housing. The X-ray tube insert includes functional parts of the X-ray system that generate X-rays, and the X-ray tube housing surrounds, protects and supports the insert. The X-ray tube housing may hermetically enclose and direct a coolant, such as dielectric oil, within the X-ray tube housing around the X-ray tube insert. A vacuum vessel of the X-ray tube insert may generate heat when operated, and the heat may be removed by circulating the coolant over the vacuum vessel. The coolant may be subsequently pumped to a heat exchanger before being returned to the X-ray tube housing.

The X-ray tube assembly may use one or more external hoses to route the coolant along a circulation path through and around the casing. For example, in some implementations, a first external hose may carry the coolant from a mid-casing portion of the X-ray tube housing to a pump housing inlet, and a second external hose may carry oil from the pump housing outlet to the heat exchanger. The heat exchanger may be integrated in an end-casing of the X-ray tube housing. The external hoses may increase an overall size and weight of the X-ray tube assembly. Additionally, the external hoses may rely on sealing joints located at each end of each hose, which generate more opportunities for leaks and may increase a cost and labor of maintaining the external hoses.

SUMMARY

The current disclosure at least partially addresses one or more of the above identified issues by an X-ray tube housing comprising a mid-casing portion, an anode-side end-casing portion, and a cathode-side end-casing portion, wherein a first flow of oil circulating around an X-ray insert enclosed within the X-ray tube housing is directed to an inlet of a housing of a pump of the anode-side end-casing portion via a first oil channel integrated into the mid-casing portion; and a second flow of oil from an outlet of the pump housing is directed to a heat exchanger located in the anode-side end-casing portion via a second oil channel integrated into the anode-side end-casing portion.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIGS. 4A-12 are drawn to scale, although other relative dimensions may be used, if desired.

Figure 1:
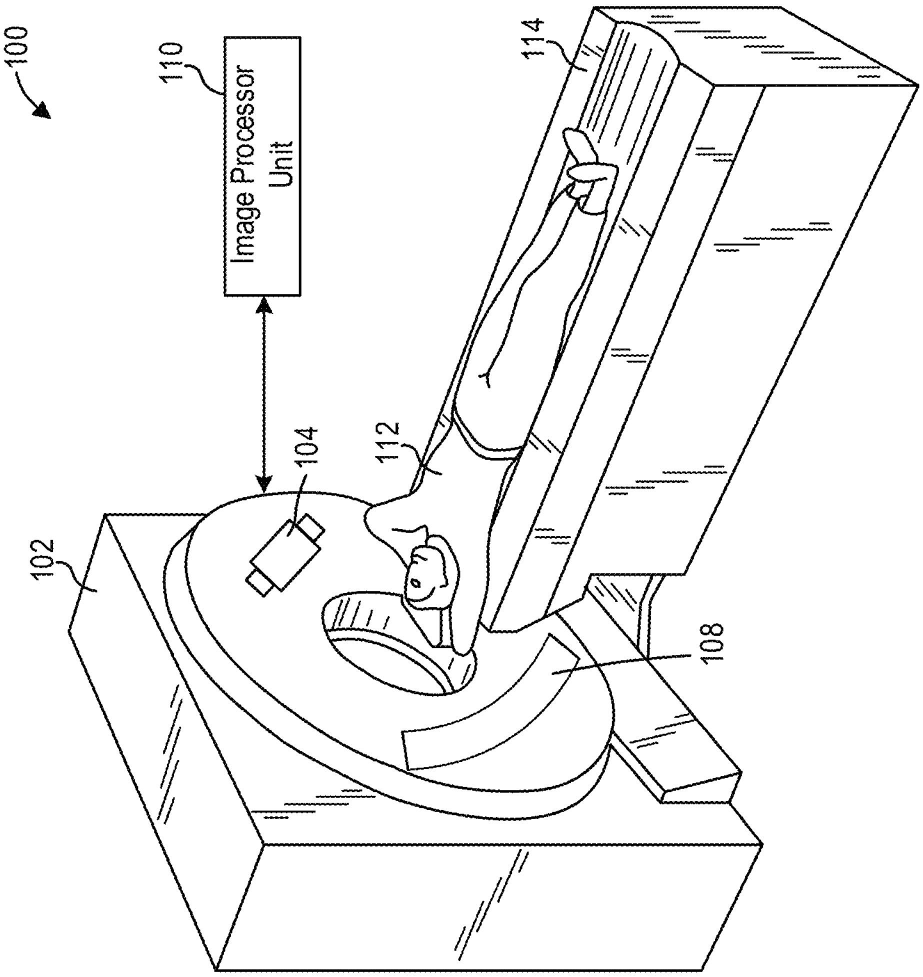
FIG. 1 shows a pictorial view of an imaging system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

This description and embodiments of the subject matter disclosed herein relate to X-ray tube assemblies used by X-ray imaging systems. Typically, an X-ray tube assembly includes an X-ray source that emits a fan-shaped beam or a cone-shaped beam towards an object, such as a patient. In some X-ray imaging systems, such as in CT systems, the X-ray source and the detector array are rotated about a gantry within an imaging plane and around the patient, and images are generated from projection data at a plurality of views at different view angles. In other X-ray imaging systems, the X-ray source and the detector array may have a fixed position.

The beam, after being attenuated by the patient, impinges upon an array of radiation detectors. The X-ray detector or detector array typically includes a collimator for collimating X-ray beams received at the detector, a scintillator disposed adjacent to the collimator for converting X-rays to light energy, and photodiodes for receiving the light energy from the adjacent scintillator and producing electrical signals therefrom. An intensity of the attenuated beam radiation received at the detector array is typically dependent upon the attenuation of the X-ray beam by the patient. Each detector element of a detector array produces a separate electrical signal indicative of the attenuated beam received by each detector element. The electrical signals are transmitted to a data processing system for analysis. The data processing system processes the electrical signals to facilitate generation of an image.

The X-ray source may include an X-ray tube that may be realized as a vacuum tube diode including a cathode and an anode. An inside of the X-ray tube may be set as a high vacuum state of about 10 mmHg. The cathode may comprise a filament that is heated to a high temperature to generate thermal electrons, by applying a current (e.g., the tube current) to an electric wire connected to the filament. A voltage difference (e.g., the tube voltage) may then be applied between the cathode and the anode, which causes the thermal electrons to accelerate towards and collide with the anode, generating an X-ray. This beam of electrons may be focused via electrostatic controls, electromagnetic controls, or a combination of electrostatic and electromagnetic controls. X-rays emitted as a result of the electrons colliding with the target are focused on the patient. When the tube voltage increases, a velocity of the thermal electrons increases, and accordingly, an energy of the X-ray (that is, energy of the photons) that is generated when the thermal electrons collide with the target is increased. When the tube current increases, the number of thermal electrons emitted from the filament is increased, and accordingly, the X-ray dose (that is, the number of X-ray photons) generated when the thermal electrons collide with the target material is increased. Thus, the energy of the X-ray may be adjusted according to the tube voltage, and the intensity of the X-ray or the X-ray dose may be adjusted according to the tube current and the X-ray exposure time.

As the tube voltage increases, an amount of heat generated by the X-ray source increases. The cathode, the anode, and other components used to generate X-rays may be included within an X-ray tube insert that is enclosed by an X-ray tube housing. The X-ray tube housing may be hermetically sealed and may direct a coolant within the X-ray tube housing around the X-ray tube insert to cool the X-ray source. The X-ray tube housing may perform the following functions:

- physically supporting the X-ray tube insert inside the X-ray tube housing, so that a first X-ray transmissive window of the X-ray tube insert is held in a position registered to a second X-ray transmissive window of the X-ray tube housing, enabling X-rays produced within the X-ray tube insert to exit the X-ray tube assembly and illuminate an object of interest;
- shielding X-rays emanating from the X-ray tube insert that do not pass through the first and second X-ray transmissive windows toward the object of interest;
- supporting a stator of a motor of the X-ray tube assembly, relative to a rotor of the motor for a rotating an anode of the X-ray tube insert;
- providing high-voltage electrical connections between the X-ray tube insert and a high voltage generator of the X-ray tube assembly, which are typically made via a high voltage plug and socket or a high voltage connector removably secured to a high voltage insulator, with a silicone gasket in-between;
- operably connecting the X-ray tube insert to a gantry or positioner of an X-ray imaging system; and
- hermetically enclosing and directing dielectric oil, or a different suitable coolant, within the X-ray tube housing around the X-ray tube insert, to cool a vacuum vessel of the X-ray tube insert, that is subsequently pumped to a heat exchanger of the X-ray tube housing.

With respect to hermetically enclosing and directing the dielectric oil (also referred to herein as oil) within the X-ray tube housing, the oil may be flowed through one or more hoses external to the X-ray tube housing to complete a closed-loop fluid circulation passage between a pump of the X-ray tube assembly and an interior space of the X-ray tube housing. The X-ray tube housing may include a plurality of casing portions that may be bolted, welded, or otherwise coupled together to form the X-ray tube housing during manufacturing. For example, the plurality of casing portions include end-casing portions at each end of the X-ray tube housing, and a mid-casing portion coupled to the end-casing portions at both sides of the mid-casing portion.

In one example, a first external hose may carry the oil from a first casing portion of the X-ray tube housing, such as the mid-casing portion, to a housing inlet of the pump. A second external hose may carry the oil from an outlet of the pump to the heat exchanger, which may be located in a second casing portion of the X-ray tube housing, such as an end-casing portion on an anode-side of the X-ray housing. It should be appreciated that while systems and methods described herein are described with respect to the dielectric oil, other types of coolant may be used without departing from the scope of this disclosure.

One problem with the inclusion of the external hoses is that as additional components, the hoses increase a complexity of manufacturing and assembling the X-ray tube assembly, and create additional opportunities for component failures. An additional disadvantage of the external hoses is that sealing joints included at ends of the external hoses may create additional opportunities for leakage and may increase the cost and an amount of maintenance performed on the X-ray tube assembly.

To address this problem, an X-ray tube housing is disclosed that has oil channels integrated the X-ray tube housing that accommodate a flow of oil through interior spaces of the X-ray tube housing. As used herein, an integrated channel is a channel that is built into the X-ray tube housing, where the channel is formed from a single continuous material of the X-ray tube housing without comprising distinct portions that are glued, soldered, bolted, attached or coupled in a different manner. A first oil channel from the mid-casing portion of the X-ray tube housing to the pump housing inlet is built into the mid-casing portion, and a second oil channel from the pump housing outlet to the heat exchanger located in the anode-side end-casing is built into the anode-side end-casing. The integrated oil channels reduce a number of sealing joints, which reduces the opportunities for leaks, and allows an X-ray tube assembly to be assembled with fewer parts. The integrated channels also decrease a size of the X-ray tube assembly, as there are no longer external hoses extending out of the housing.

FIG. 1 illustrates an exemplary X-ray system 100 configured for computed tomography (CT) imaging. While a CT imaging system is described herein, it should be appreciated that the systems described herein may be used with other types of X-ray imaging systems without departing from the scope of this disclosure. The X-ray system 100 is configured to image a subject 112 such as a patient, an inanimate object, one or more manufactured parts, and/or foreign objects such as dental implants, stents, and/or contrast agents present within the body. In one embodiment, the X-ray system 100 includes a gantry 102, which in turn, may further include at least one X-ray source 104 configured to project a beam of X-ray radiation 106 (see FIG. 2) for use in imaging the subject 112 laying on a table 114. Specifically, the X-ray source 104 is configured to project the X-ray radiation beams 106 towards a detector array 108 positioned on the opposite side of the gantry 102. Although FIG. 1 depicts a single X-ray source 104, in certain embodiments, multiple X-ray sources and detectors may be employed to project a plurality of X-ray radiation beams for acquiring projection data at different energy levels corresponding to the patient.

The X-ray system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112.

In some CT imaging system configurations, an X-ray source projects a cone-shaped X-ray radiation beam which is collimated to lie within an X-Y-Z plane of a Cartesian coordinate system and generally referred to as an "imaging plane." The X-ray radiation beam passes through an object being imaged, such as the patient or subject. The X-ray radiation beam, after being attenuated by the object, impinges upon an array of detector elements. The intensity of the attenuated X-ray radiation beam received at the detector array is dependent upon the attenuation of an X-ray radiation beam by the object. Each detector element of the array produces a separate electrical signal that is a measurement of the X-ray beam attenuation at the detector location. The attenuation measurements from all the detector elements are acquired separately to produce a transmission profile.

In some CT systems, the X-ray source and the detector array are rotated with a gantry within the imaging plane and around the object to be imaged such that an angle at which the X-ray beam intersects the object constantly changes. A group of X-ray radiation attenuation measurements, e.g., projection data, from the detector array at one gantry angle is referred to as a "view." A "scan" of the object includes a set of views made at different gantry angles, or view angles, during one revolution of the X-ray source and detector.

The X-ray source 104 includes an anode and a cathode. Electrons emitted by the cathode (e.g., resulting from energization of the cathode) may be intercepted by a target arranged at or near the anode. Electrons intercepted by the target may release energy in the form of X-rays, with the X-rays being directed toward the detector array 108.

Figure 2:
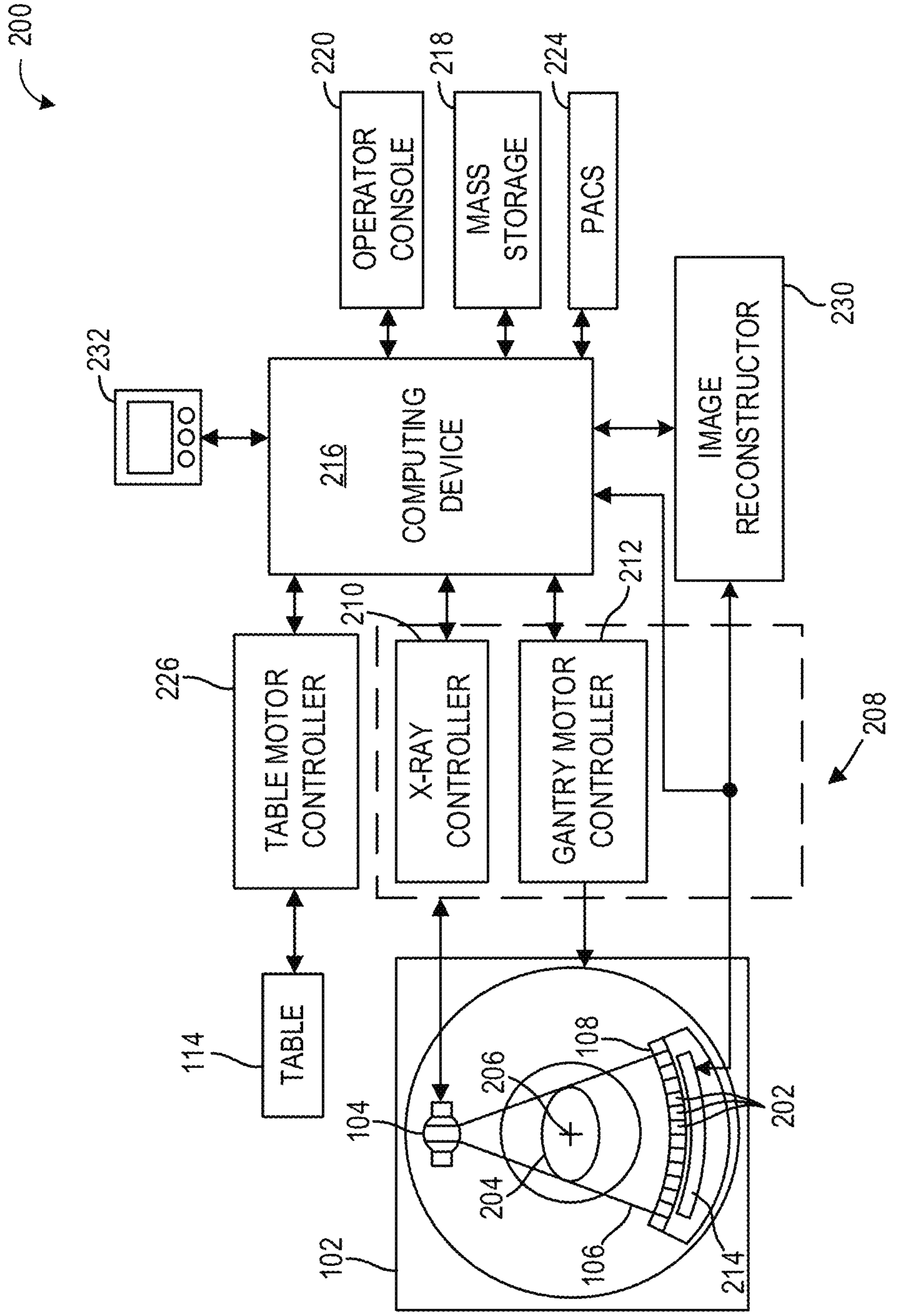
FIG. 2 shows a block schematic diagram of an exemplary imaging system, in accordance with one or more embodiments of the present disclosure.

FIG. 2 illustrates an exemplary X-ray imaging system 200 similar to the X-ray system 100 of FIG. 1. In accordance with aspects of the present disclosure, the X-ray imaging system 200 is configured for imaging a subject 204 (e.g., the subject 112 of FIG. 1). In one embodiment, the X-ray imaging system 200 includes the detector array 108 (see FIG. 1). The detector array 108 further includes a plurality of detector elements 202 that together sense the X-ray radiation beam 106 (see FIG. 2) that pass through the subject 204 (such as a patient) to acquire corresponding projection data. In some embodiments, the detector array 108 may be fabricated in a multi-slice configuration including the plurality of rows of cells or detector elements 202, where one or more additional rows of the detector elements 202 are arranged in a parallel configuration for acquiring the projection data.

In certain embodiments, the X-ray imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the X-ray source 104 and the detector array 108 rotate, the detector array 108 collects data of the attenuated X-ray beams. The data collected by the detector array 108 undergoes pre-processing and calibration to condition the data to represent the line integrals of the attenuation coefficients of the scanned subject 204. The processed data are commonly called projections. In some examples, the individual detectors or detector elements 202 of the detector array 108 may include photon-counting detectors which register the interactions of individual photons into one or more energy bins.

In one embodiment, the X-ray imaging system 200 includes a control mechanism 208 to control movement of the components such as rotation of the gantry 102 and the operation of the X-ray source 104. In certain embodiments, the control mechanism 208 further includes an X-ray controller 210 configured to provide power and timing signals to the X-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The data sampled and digitized by the DAS 214 is transmitted to a computer or computing device 216. In one example, the computing device 216 stores the data in a storage device or mass storage device 218. The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the X-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

In one embodiment, for example, the X-ray imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized X-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the X-ray imaging system 200 and instead the computing device 216 may perform one or more functions of the image reconstructor 230. Moreover, the image reconstructor 230 may be located locally or remotely, and may be operatively connected to the X-ray imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Figure 3:
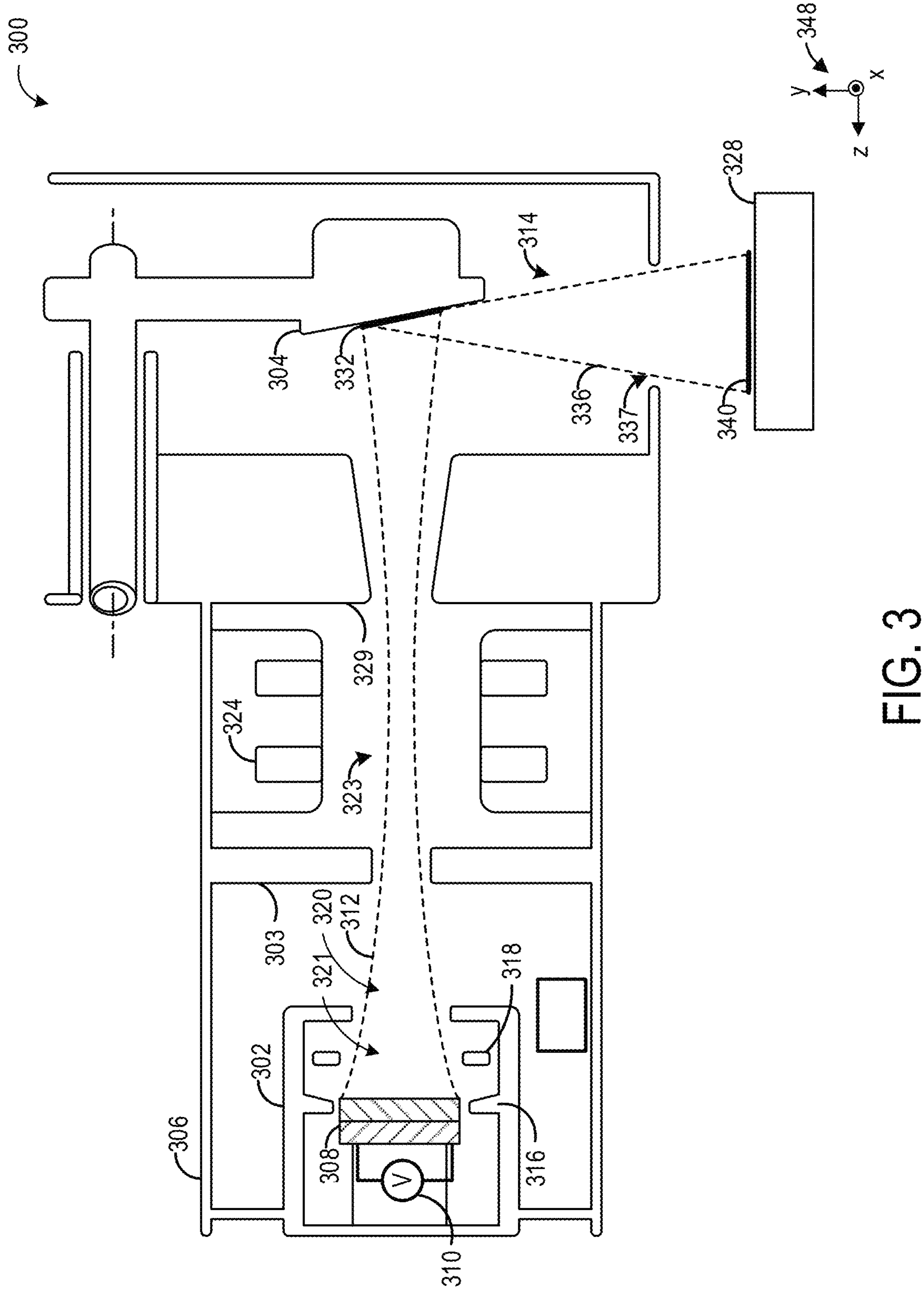
FIG. 3 is a schematic diagram of an exemplary X-ray tube, in accordance with one or more embodiments of the present disclosure.

Referring now to FIG. 3, an exemplary X-ray tube 300 of an X-ray system is shown. In one embodiment, the X-ray tube 300 may be the X-ray source 104 of the X-ray systems 100 and 200 of FIGS. 1-2, respectively. In the illustrated embodiment, the X-ray tube 300 includes an exemplary cathode 302 and an anode 303 disposed within a tube casing 306. The cathode may include a filament 308. The cathode 302, and in particular the filament 308, may be directly heated by passing a current through the filament 308, which may be supplied by a voltage source 310. In one embodiment, a current of about 10 amps (A) may be passed through the filament 308. The filament 308 may emit an electron beam 312 as a result of being heated by the current supplied by the voltage source 310. As used herein, the term "electron beam" may be used to refer to a stream of electrons that have substantially similar velocities.

The electron beam 312 may be directed towards a target 304 to produce X-rays 314. More particularly, the electron beam 312 may be accelerated from the filament 308 towards the target 304 by applying a potential difference between the filament 308 and the anode 303. In one embodiment, a high-voltage in a range from about 40 kV to about 450 kV may be applied to set up the potential difference between the filament 308 and the anode 303, thereby generating one or more electric fields 320 in the X-ray tube 300. In one embodiment, a high-voltage differential of about 140 kV may be applied between the filament 308 and the anode 303 to accelerate the electrons in the electron beam 312 towards the target 304. As an example, the filament 308 may be at a potential of about −140 kV and the anode 303 and target 304 may be at ground potential or about zero volts.

The electron beam 312 may impinge on the target 304 at a focal spot 332. When the electron beam 312 impinges upon the target 304, heat may be generated in the target 304 at a location of the focal spot 332, which may be significant enough to melt the target 304. In various embodiments, a rotating target may be used to mitigate the problem of heat generation in the target 304. For example, the target 304 may be configured to rotate such that the focal spot 332 generated by the electron beam 312 striking the target 304 does not strike the target 304 consistently at the same location, so that the target 304 may not melt. In various embodiments, the target 304 may include materials such as, but not limited to, tungsten or molybdenum.

The heat generated in the target 304 may also be reduced by adjusting a size of a focal spot on the target 304, where a smaller focal spot may generate a greater amount of heat at a specific location. An electron collector 329, held at a same potential as the target 304, serves as a sink of electrons that bounce off the surface of 304 during the initial impact, which reduces the chance of those same electrons re-striking the target. Collecting the backscattered electrons in this way further may reduce target heating. Nevertheless, heat may build up within X-ray tube 300 during operation of the X-ray tube 300. As described in greater detail below, the heat may be reduced via a cooling system that directs a flow of oil around portions of an X-ray tube assembly including the X-ray tube 300.

The X-ray tube 300 may include one or more focusing electrodes 316, which may be disposed adjacent to the filament 308 such that the one or more focusing electrodes 316 focus the electron beam 312 towards the target 304. As used herein, the term "adjacent" means near to in space or position. To focus the electron beam 312, voltages may be applied to the one or more focusing electrodes 316 to generate the one or more electric fields 321. The voltages may be different for each of the one or more focusing electrodes 316.

Additionally, the X-ray tube 300 may include one or more extraction electrodes 318, which may be used for additionally controlling and focusing the electron beam 312 towards the anode 303. The one or more extraction electrodes 318 may be located between the anode 303 and the filament 308. In some embodiments, the one or more extraction electrodes 318 may be positively biased by supplying a desired voltage to the one or more extraction electrodes 318.

An energy of the electron beam 312 may be controlled in various ways. For instance, the energy the electron beam 312 may be controlled by altering the potential difference (e.g., an acceleration voltage) between the cathode 302 and the anode 303. As used herein, the term "electron beam current" refers to a flow of electrons per second between the cathode 302 and the anode 303. The current of the electron beam 312 may be controlled by adjusting the filament voltage to change the temperature of the filament 308. The electron beam current may be controlled by altering the voltage applied to the one or more extraction electrodes 318. It may be noted that the filament 308 may be treated as an infinite source of electrons.

The one or more electric fields 321 may be generated between the one or more extraction electrodes 318 and the one or more focusing electrodes 316 due to a potential difference between the one or more focusing electrodes 316 and the one or more extraction electrodes 318. A strength of the one or more electric fields 320 may be employed to control the intensity of electron beam 312 generated by the filament 308 towards the anode 303. More particularly, the one or more electric fields 320 may cause the electrons emitted by the filament 308 to be accelerated towards the anode 303. The stronger the one or more electric fields 320, the stronger the acceleration of the electrons from the filament 308 towards the anode 303. Alternatively, the weaker the one or more electric fields 320, the lesser the acceleration of electrons from the filament 308 towards the anode 303. The intensity of the electron beam 312 striking the target 304 may thus be controlled by the one or more electric fields 320 and 321.

Additionally, the X-ray tube 300 may also include one or more magnets 324 for focusing and/or positioning and deflecting the electron beam 312 onto the target 304. In various embodiments, the one or more magnets 324 may be disposed between the cathode 302 and the target 304. In some embodiments, the one or more magnets 324 may include one or more multipole magnets for influencing focusing of the electron beam 312 by creating one or more magnetic fields 323 that shapes the electron beam 312 on the target 304. The one or more multipole magnets may include one or more quadrupole magnets, one or more dipole magnets, or combinations thereof.

As properties of the electron beam current and voltage change, electrostatic focusing of the electron beam 312 will change accordingly. When the electron beam 312 has been focused and positioned, the electron beam 312 impinges upon the target 304 at a focal spot 332 to generate the X-rays 314. The X-rays 314 generated by collision of the electron beam 312 with the target 304 may be directed from the X-ray tube 300 through an opening in the tube casing 306, at an X-ray window 337, towards an object 328.

As a result of the electron beam 312 colliding with target 304 at the focal spot 332, a set of X-rays 336 may be generated and directed out X-ray window 337 towards the object 328. The set of X-rays 336 may intersect with the object 328 at an effective focal spot 340. A configuration of X-ray tube 300 and the effective focal spot is indicated by a set of reference coordinate axes 348.

As described above, heat generated at various components of X-ray tube 300 may be reduced by enclosing X-ray tube 300 within a container, referred to herein as an X-ray insert, which is surrounded by a housing, such that a flow of oil may be routed between portions of the X-ray insert and the housing. The oil may be directed along an oil circuit by a pump coupled to the housing. The oil circuit may include a heat exchanger that extracts the heat and transfers it to an external environment of the X-ray system.

Figure 4A:
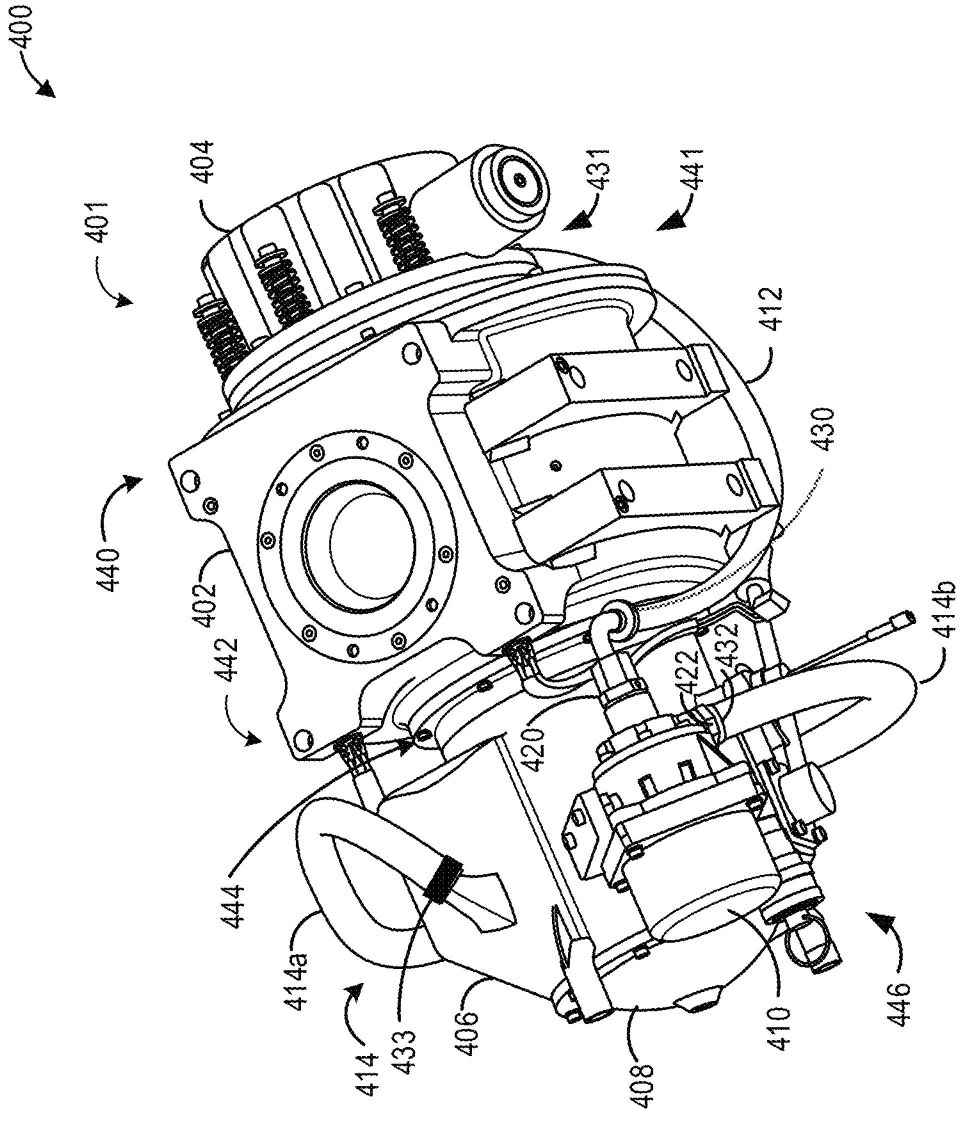
FIG. 4A (Prior Art)
FIG. 4A shows a perspective view of a first X-ray tube assembly, as prior art.

FIG. 4A shows a perspective view of a conventional housing 401 of a first X-ray tube assembly 400 of an X-ray system, as prior art. The housing 401 typically includes various separately-formed pieces, which in the depicted embodiment include a mid-casing portion 402, a cathode-side end-casing portion 404, an anode-side end-casing portion 406, and an end cap 408. The separately-formed pieces are subsequently joined together by welding, bolting, and/or brazing processes, to enclose an X-ray tube insert positioned therein.

The mid-casing portion 402 has a first side 440 and a second side 442. A first side 441 of the cathode-side end-casing portion 404 is coupled to the first side 440 of the mid-casing portion 402. The anode-side end-casing portion 406 has a first side 444 and a second side 446, where the second side 442 of the mid-casing portion 402 is coupled to the first side 444 of the anode-side end-casing portion 406.

Heat may be generated by X-ray tube components inside the X-ray insert, such as a cathode, anode, and target of the X-ray tube, and/or a shaft and bearing of a stator of the X-ray tube assembly. The heat generated by X-ray tube may be dissipated by flowing a dielectric oil or similar suitable coolant around the X-ray insert, via a cooling system disposed externally of the housing 401. The heat may be transferred to a second coolant, such as water, a water/glycol mixture, or any other suitable fluid having desirable heat exchange properties, for example, at a dedicated oil-to-water heat exchanger positioned within the anode-side end-casing 406. The cooling system may include a pump 410 that circulates the oil through the dedicated oil-to-water heat exchanger, to thermally cool the oil. The water or second coolant may be subsequently cooled at an external cooling unit, via a separate coolant circuit (not shown in FIG. 4A). The oil may also support the X-ray tube insert within the housing and provide heat removal from the X-ray tube insert.

In the conventional housing 401, an oil circuit by which the oil may be circulated through the pump 410 includes two external hoses. Specifically, a first external hose 412 may carry the oil from the cathode-side end-casing portion 404 of the housing 401 to a pump housing inlet 420, and a second external hose 414 may carry the oil from a pump housing outlet 422 to a heat exchanger integrated into the anode-side end-casing portion 406. In FIG. 4A, a first section 414*a* of the second external hose 414 is shown at the top of FIG. 4A, and a second section 414*b* of the second external hose 414 is shown at the bottom of FIG. 4A, with the external hose 414 being obscured by the anode-side end-casing portion 406. A disadvantage of the conventional housing 401 is that the external hoses 414 may increase a size, weight, and complexity of the first X-ray tube assembly 400. The increased size and weight may limit a degree of oblique imaging angles around the patient that can be utilized by the X-ray tube assembly, potentially compromising a quality of an exam performed.

The first external hose 412 may be attached to the pump housing inlet 420 via a first elbow 430, which may include sealing joints at both ends of the first elbow 430. Additionally, in some embodiments, the first elbow 430 may be coupled to a first adapter positioned at the pump housing inlet 420, and a sealing joint may be included between the first adapter and the pump housing inlet 420. Similarly, the first external hose 412 may be attached to the cathode-side end-casing portion 404 via a second elbow 431 and a second adaptor, which may include three additional sealing joints. The second external hose 414 may be attached to the pump housing outlet 422 via a coupling 432, which may include a plurality of sealing joints, and the second external hose 414 may be attached to the anode-side end-casing portion 406 at an entry to the heat exchanger via a coupling 433, which may include a second plurality of sealing joints. The sealing joints may be formed by an O-ring or gasket made with rubber or a different suitable material. The sealing material used may have the disadvantage that if the material is not compatible with the oil used inside the X-ray tube or X-ray radiation, the sealing material can degrade over time. At each sealing joint, there is also a possibility that a clamping created either by torquing bolts or crimping clamps may become loose over time. As a result, the sealing joints may degrade over time, generating oil leaks. The oil leaks may reduce an ability of the oil to reduce heat generated within the X-ray housing, and decrease a functionality and/or efficiency of the X-ray housing. Because repairing the sealing joints may not be feasible, the X-ray tube may have to be replaced, which may be costly and may result in the X-ray system being shut down and not available for use until the replacement has been accomplished.

Figure 4B:
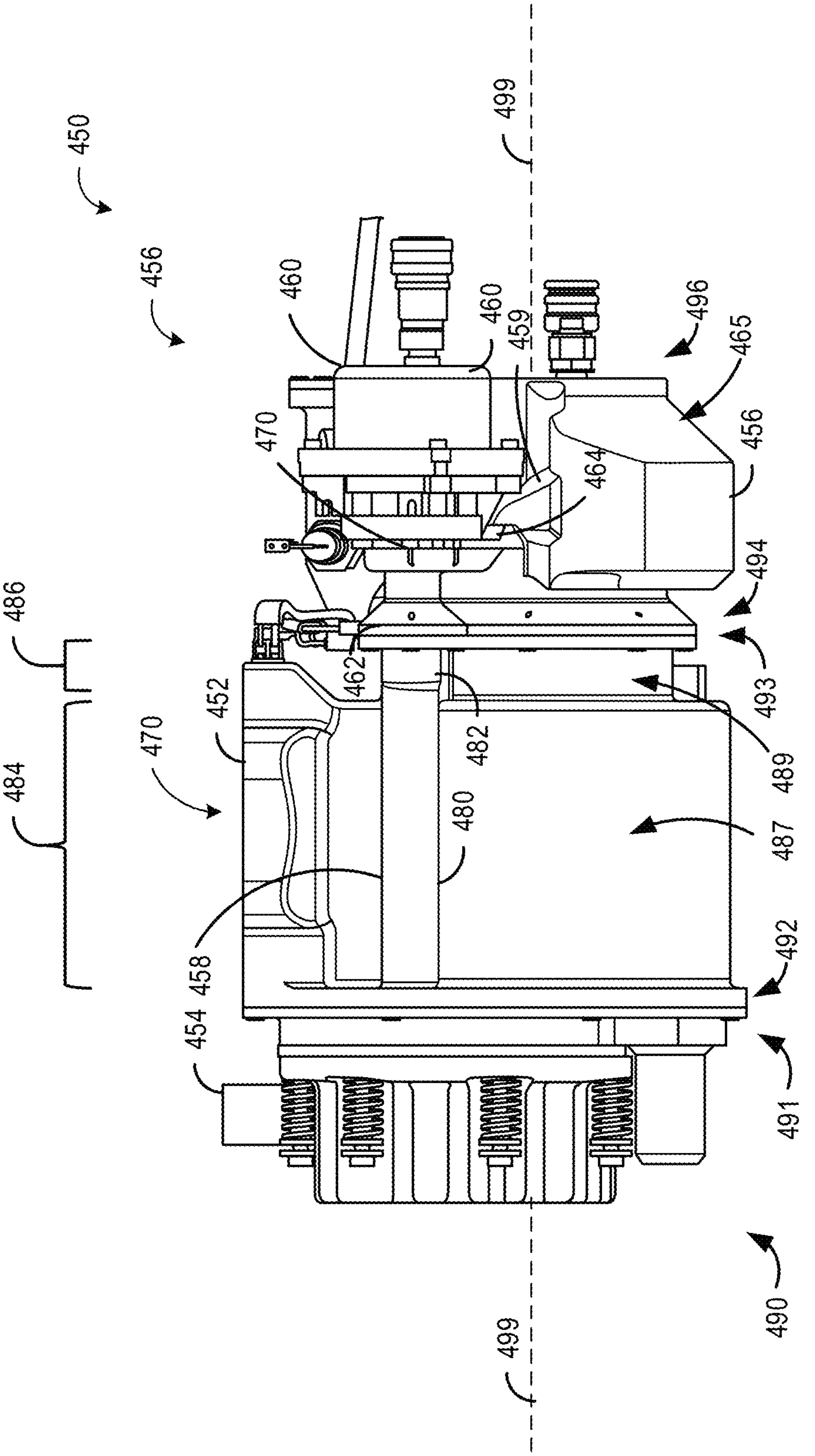
FIG. 4B shows a perspective view of a second X-ray tube assembly, in accordance with one or more embodiments of the present disclosure.

In contrast, FIG. 4B shows a perspective view of a proposed alternative, second X-ray tube assembly 450 that does not include the external hoses 414. The second X-ray tube assembly 450 includes a housing 451, which comprises a mid-casing portion 452, a cathode-side end-casing portion 454, and an anode-side end-casing 456, similar to the mid-casing portion 402, the cathode-side end-casing portion 404, and the anode-side end-casing portion 406 of FIG. 4A. The second X-ray tube assembly 450 also includes a pump 460, which may be the same as or similar to the pump 410 of FIG. 4A. The cathode-side end-casing portion 454 has a first side 490 and a second side 491; the mid-casing portion 452 has a first side 492 and a second side 493; and an anode-side end-casing 456 has a first side 494 and a second side 496.

The mid-casing portion 452 may be a generally cylindrical casing portion with a central axis 499, that is open at each of first side 492 and second side 493, within which cathode, anode and other portions of the X-ray tube are disposed. The anode-side end-casing portion 456 may also be generally cylindrical around the central axis 499, and may enclose a stator basket (not shown) disposed within an interior of the anode-side end-casing portion 456, around a shaft and bearing assembly (not shown in FIG. 4B). The stator may be operably connected to a voltage source (not shown) via a suitable connector (not shown) extending through an aperture in the anode-side end-casing portion 456 to supply current to the stator to enable the stator to interact with and spin the shaft when the X-ray tube insert is operated. The anode-side end-casing portion 456 may be secured to the mid-casing portion 452 to seal the anode-side end-casing portion 456 to the mid-casing portion 452. When sealed, the space formed by anode-side end-casing portion 456, mid-casing portion 452 and cathode-side end-casing portion 454 may be filled with an amount of dielectric oil to provide cooling to the operation of the Xray insert.

In contrast to FIG. 4A, the mid-casing portion 452 includes a first integrated oil channel 458, which may carry the oil from the mid-casing portion 452 of the housing 451 to a pump housing inlet 470. The first integrated oil channel 458 may have two parts: a first part 480, and a second part 482. The first part 480 may be aligned with a first-diameter region 487 of mid-casing portion 452, and the second part 482 may be aligned with a second-diameter region 489 of mid-casing portion 452, where the second-diameter region 489 has a smaller diameter than the first-diameter region 487. The second part 482 has a second length 486, which may be smaller than a first length 484 of the first part 480. In one example, the first length 484 is 144 mm, and the second length 486 is 35 mm.

The first integrated oil channel 458 may replace the first external hose 412 of FIG. 4A. The second part 482 of the first integrated oil channel 458 may be coupled to a pump housing 462 of the anode-side end-casing portion 456, between the second side 493 of the mid-casing portion 452 and a first side 494 of the anode-side end-casing portion 456, such that an interior of the second part 482 of the first integrated oil channel 458 is connected to an interior channel of the pump housing inlet 470. For example, a total distance from the end of the first part 480 and the beginning of second part 482 to an end of the pump housing inlet 470 at the pump 460 may be 82 mm, in one example.

The anode-side end-casing portion 456 includes a second integrated oil channel 459, which may carry oil exiting the pump 460 via an outlet 464 of the pump 460 to a heat exchanger integrated into a portion 465 of the anode-side end-casing portion 456. The second integrated oil channel 459 may replace the second external hose 414 of FIG. 4A.

Thus, rather than relying on the external hoses 412 and 414 of FIG. 4A, the oil may be advantageously directed through the first integrated oil channel 458 and the second integrated oil channel 459, which are integrated directly into casing portions of second X-ray tube assembly 450. As a result, the external hoses 412 and 414 may be eliminated, reducing a complexity of assembling the second X-ray tube assembly 450. Additionally, a cost of the second X-ray tube assembly 450 may be reduced due to eliminating the external hoses 412 and 414, the elbows 430 and 431, and associated adapters, clamps, etc.

Additionally, because the first integrated oil channel 458 may be formed during a casting of the mid-casing portion 452 rather than using additive manufacturing, a cost of manufacturing the second X-ray tube assembly 450 may be lower than a cost of manufacturing the first X-ray tube assembly 400 of FIG. 4A. Additionally, the cost of manufacturing the second X-ray tube assembly 450 may be lower than a cost of manufacturing other X-ray tube assemblies that rely on expensive additive manufacturing techniques for manufacturing the mid-casing portion 452.

As used herein, the term "additive manufacturing techniques" include but are not limited to various known 3D printing manufacturing methods such as Extrusion Deposition, Wire, Granular Materials Binding, Powder Bed and Inkjet Head 3D Printing, Lamination, Photo-polymerization, and Direct Metal Laser Melting (DMLM). DMLM is a known manufacturing process that fabricates metal components using three-dimensional information, for example a three-dimensional computer model of a casing. The three-dimensional information is converted into a plurality of slices where each slice defines a cross section of the component for a predetermined height of the slice. The casing is then "built-up" slice by slice, or layer by layer, until finished. Each layer of the casing is formed by melting or fusing layers of metallic powders, such as aluminum powders, or other materials/metals, such as stainless steel, to one another using a laser.

Although DMLM may be a preferred method for additive manufacturing, those skilled in the art of manufacturing will recognize that any other suitable rapid manufacturing methods using layer-by-layer construction or additive fabrication can also be used. These alternative rapid manufacturing methods include, but not limited to, Binderjet printing, Selective Laser Sintering (SLS), 3D printing, such as by inkjets and laserjets, Sterolithography (SLS), Direct Selective Laser Sintering (DSLS), Electron Beam Sintering (EBS), Electron Beam Melting (EBM), Laser Engineered Net Shaping (LENS), Laser Net Shape Manufacturing (LNSM) and Direct Metal Deposition (DMD).

Further, because the second X-ray tube assembly 450 does not include sealing joints, a likelihood of oil leaks in the second X-ray tube assembly 450 may be lower than with the first X-ray tube assembly 400, and a cost and effort of maintaining the second X-ray tube assembly 450 may be reduced relative to the first X-ray tube assembly 400 of FIG. 4A. The second X-ray tube assembly 450 may have a smaller footprint and/or weight than the first X-ray tube assembly 400, which may increase a range of oblique scanning angles around the patient that can be utilized by the X-ray tube assembly 450. The integrated channel designs also enable a reduction in a volume of oil used inside the X-ray tube, since the length of the first integrated oil channel 458 and the second integrated oil channel 459 may be less than the length of the external hoses 412 and 414 of the first X-ray tube assembly 400. The second X-ray tube assembly 450 may also have the advantage of increasing a heat dissipation with respect to the external hoses 412 and 414, as the walls of the first integrated oil channel 458 and the second integrated oil channel 459 are made with heat-conducting metal, which can transfer heat from hot oil inside the first integrated oil channel 458 and the second integrated oil channel 459 to relatively colder air outside more efficiently than the external hoses 412 and 414.

Figure 5:
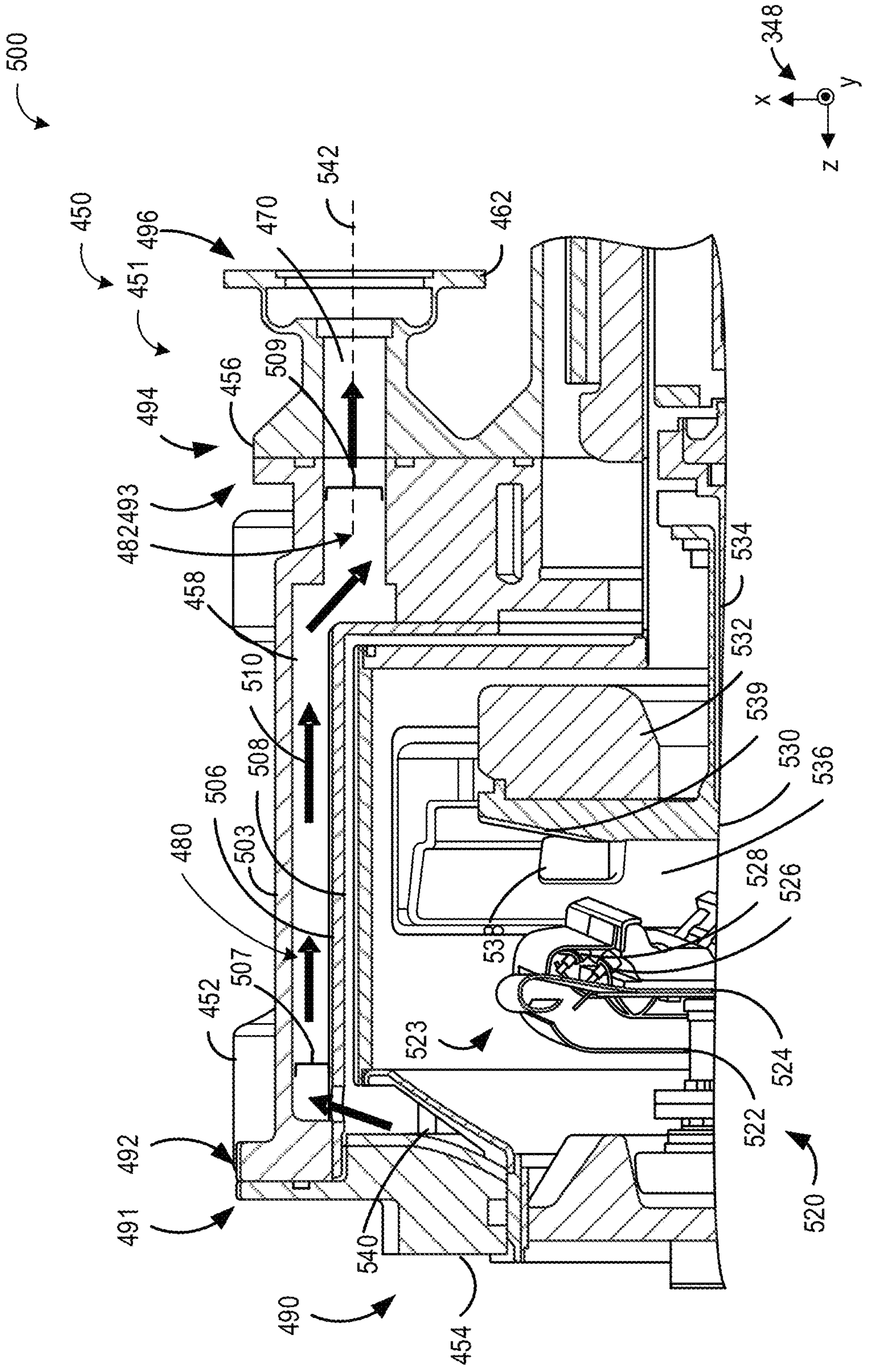
FIG. 5 shows side view of the second X-ray tube assembly, in accordance with one or more embodiments of the present disclosure.

A configuration of the first integrated oil channel 458 and the second integrated oil channel 459 with respect to components of the second X-ray tube assembly 450 is shown in greater detail in FIG. 5.

FIG. 5 shows a cut-away view 500 of the second X-ray tube assembly 450, including many of the components of FIG. 4B, which are similarly labeled for consistency. Cut-away view 500 depicts the mid-casing portion 452, the cathode-side end-casing portion 454, and the anode-side end-casing 456 from the side perspective of FIG. 4B. In addition, cut-away view 500 shows a cut-away section of an X-ray insert 520 housed within the mid-casing portion 452, which encloses various components of an X-ray tube of the X-ray system. The various components may be the same as or similar to components of X-ray tube 300 of FIG. 3, and may be oriented similarly, as shown by the reference axes 348.

The various components include a cathode assembly 523 (e.g., cathode 302 of FIG. 3), which is configured to generate an electron beam that is directed towards an anode 532 (e.g., anode 303), as a result of a voltage difference introduced between the cathode assembly 523 and the anode 532. The cathode assembly 523 may consist of various components including a mask 522, an arm 524, a cup 528, and filaments with connections 526. A voltage difference may be generated by applying a high voltage at the cathode assembly 523 while maintaining anode 532 at ground potential, or by applying negative and positive high voltages of equal value at cathode assembly 523 and anode 532. The electron beam may be generated by applying a current to the connections 526. The electron beam may be directed at a target 530 (e.g., target 304), which may be positioned on a disc that spins around a shaft 534, such that the electron beam may impinge on different locations of a face 539 of the target 530. When the electron beam strikes the target 530, X-rays may be generated. The electrons scattered after striking the target may be captured by a collector 536 to reduce focal radiation. The X-rays may be directed out an X-ray window 538 (e.g., X-ray window 337), toward a patient of the X-ray system.

Additionally, the cut-away view 500 shows a series of arrows 510, which indicate a direction of oil flow through the first integrated oil channel 458. The first part 480 of the first integrated oil channel 458 traverses the mid-casing portion 452 across the X-ray insert 520. The second part 482 leads from the first part 480 to a coupling with the pump housing inlet 470. A first diameter 507 of the first part 480 may be different from a second diameter 509 of the second part 482. In various embodiments, the second diameter 509 is greater than the first diameter 507. In one example, the first diameter 507 is 9 mm and the second diameter 509 is 15 mm.

As shown by the arrows 510, the oil enters the first integrated oil channel 458 from a space 540 between the X-ray insert 520, mid casing 452, and cathode-side end-casing portion 454 of the second X-ray tube assembly 450. The oil flows from the first integrated oil channel 458 into the pump housing inlet 470. The second side 493 of the mid-casing portion 452 may be coupled to the first side 494 of the anode-side end-casing 456 using threaded fasteners such as bolts, or other methods such as circlips or welding, such that the first integrated oil channel 458 and the pump housing inlet 470 are coaxially aligned along a same central axis 542. In this way, the flow of the oil may pass unimpeded directly from the first integrated oil channel 458 into the pump housing inlet 470, without changing a direction of the flow of the oil. The central axis 542 may be parallel to the central axis 499 of the mid-casing portion.

A backup plate 506 may form a portion of an interior surface of the first integrated oil channel 458. In some embodiments, a lead lining 508 may be included between the backup plate 506 and components of an X-ray tube insert positioned inside the mid-casing portion 452. The lead lining 508 may be thicker than the backup plate 506. For example, the backup plate 506 may have a thickness of 1 mm, and the lead lining may have a thickness of 3 mm. The lead lining 508 may act as a shield to prevent X-rays above a threshold amount from leaking through the mid-casing portion 452 or the cathode-side end-casing portion 454. The backup plate

506 acts as first portion of a wall of the first integrated oil channel 458, and as structural support to lead lining 508, since the lead lining 508 may be relatively soft and may deform during manufacturing without support. Thus, the first integrated oil channel 458 is formed by an outer wall 503 of the mid-casing portion 452, the lead lining 508, and the backup plate 506.

Figure 6A:
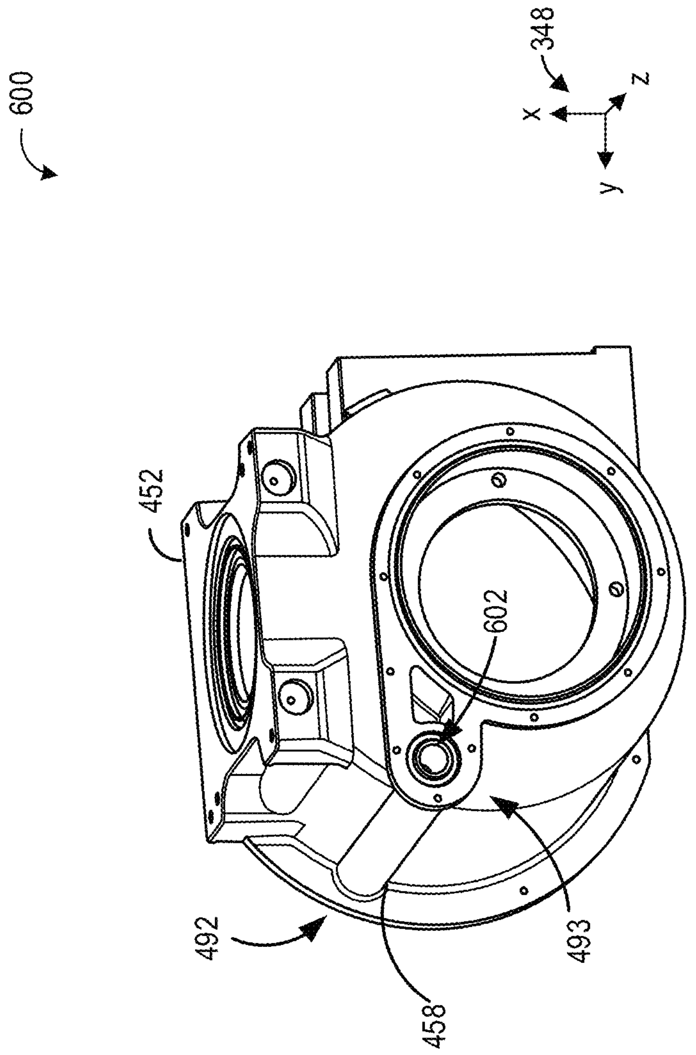
FIG. 6A shows a first perspective view of an exterior of a mid-casing portion of the second X-ray tube assembly, in accordance with one or more embodiments of the present disclosure.
Figure 6B:
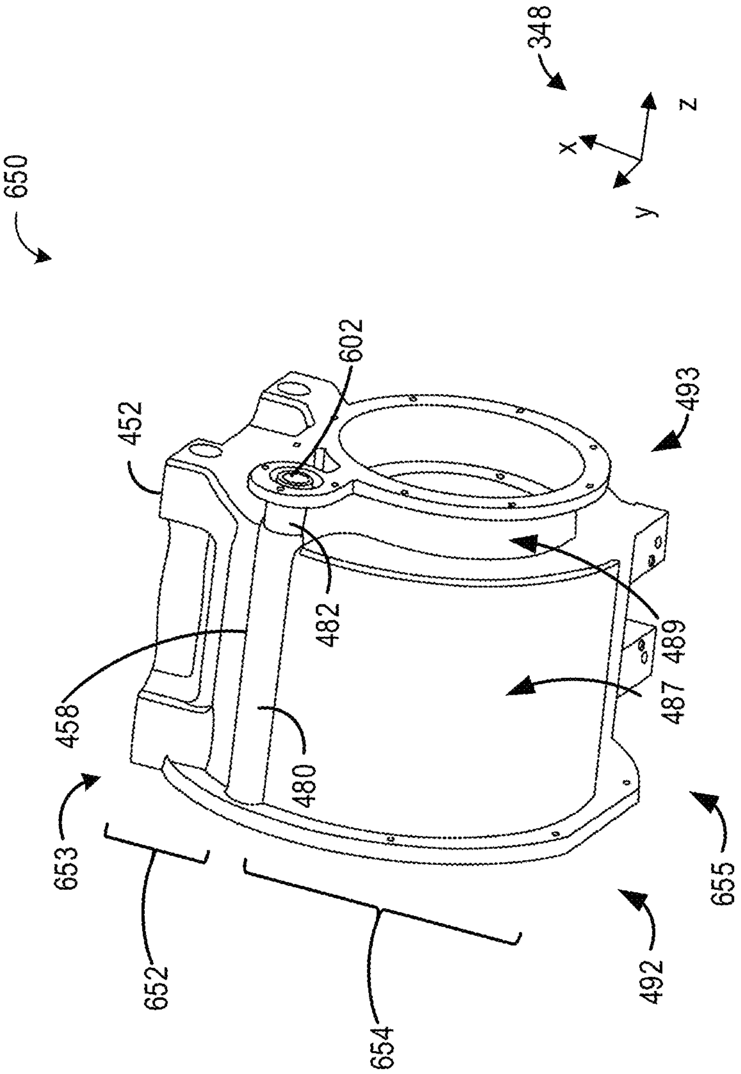
FIG. 6B shows a second perspective view of the exterior of the mid-casing portion of the second X-ray tube assembly, in accordance with one or more embodiments of the present disclosure.

FIG. 6A shows a first perspective view 600 of an exterior of the mid-casing portion 452 of the second X-ray tube assembly 450, where the first integrated oil channel 458 is integrated into the exterior of the mid-casing portion 452. An aperture 602 at second side 493 of the mid-casing portion 452 may connect the interior of the first integrated oil channel 458 to the pump housing inlet 470 (not shown in FIG. 6). A second aperture (not shown in FIG. 6A) at the first side 492 of the mid-casing portion 452 may connect the interior of the first integrated oil channel 458 to the space 540 containing oil between the X-ray insert 520, mid-casing portion 452 and cathode-side end-casing portion 454. FIG. 6B shows a second perspective view 650 of the exterior of the mid-casing portion 452 of the second X-ray tube assembly 450, where the first integrated oil channel 458 integrated into the exterior of the mid-casing portion 452 is also shown. In the depicted embodiment, the first integrated oil channel 458 is positioned at a first distance 652 from a reinforced upper portion 653 of the mid-casing portion 452 (e.g., along the X axis of reference coordinate system 348), and at a second distance 654 from a lower portion 655 of the mid-casing portion 452, where the second distance 654 may be greater than the first distance 652. Positioning the first integrated oil channel 458 at the first distance 652 (e.g., closer to the reinforced upper portion 653 than the lower portion 655) may increase a structural rigidity of the mid-casing portion 452. In other words, the positioning the first integrated oil channel 458 may take advantage of the greater structural support and mass of the reinforced upper portion 653 with respect to the lower portion 655, which may increase an overall strength of the mid-casing portion 452.

Figure 7:
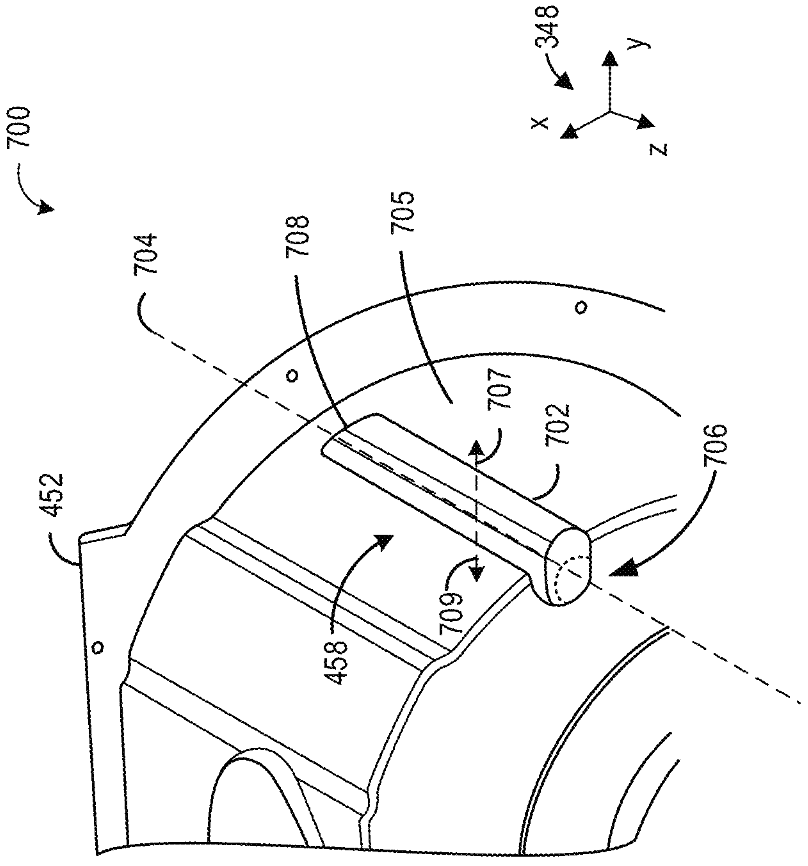
FIG. 7 shows a second perspective view of an interior of the mid-casing portion of the second X-ray tube assembly, in accordance with one or more embodiments of the present disclosure.

FIG. 7 shows a perspective view 700 of an interior of the mid-casing portion 452 of the second X-ray tube assembly 450. The perspective view 700 shows an alignment of the first integrated oil channel 458 along a wall 705 of the mid-casing portion 452. The first integrated oil channel 458 connects to the space 540 through an aperture 708 at the second side 493 of the mid-casing portion 452. A second end 706 of the first integrated oil channel 458 leads to the pump housing 462. As can be seen in FIG. 7, the first integrated oil channel 458 may be integrated into the mid-casing portion 452 such that a central axis 704 of the first integrated oil channel 458 is aligned with the wall 705 of the mid-casing portion 452, with a first circumferential portion of the first integrated oil channel 458 extending outward from an external surface of the mid-casing portion 452 in a direction 709, and a second circumferential portion of the first oil channel extending inward from an internal surface of the mid-casing portion 452 in a direction 707.

Figure 8:
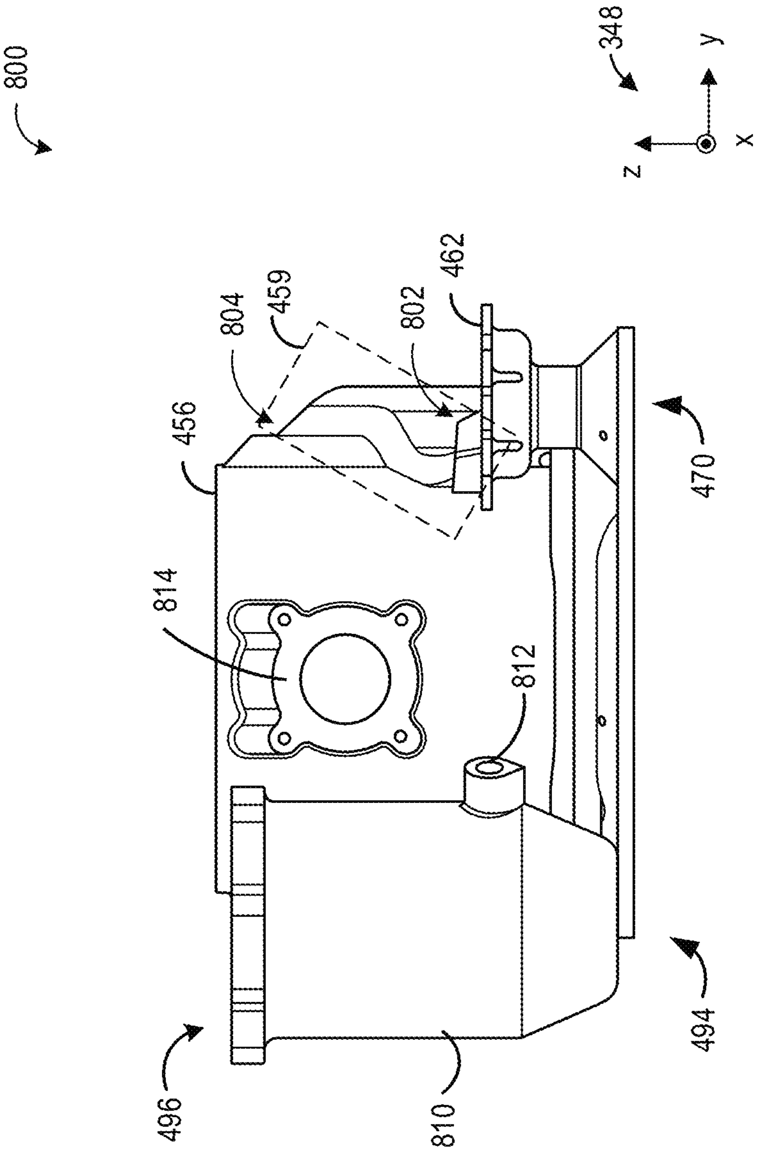
FIG. 8 shows a side view of an end-casing portion of the second X-ray tube assembly, in accordance with one or more embodiments of the present disclosure.
Figure 9:
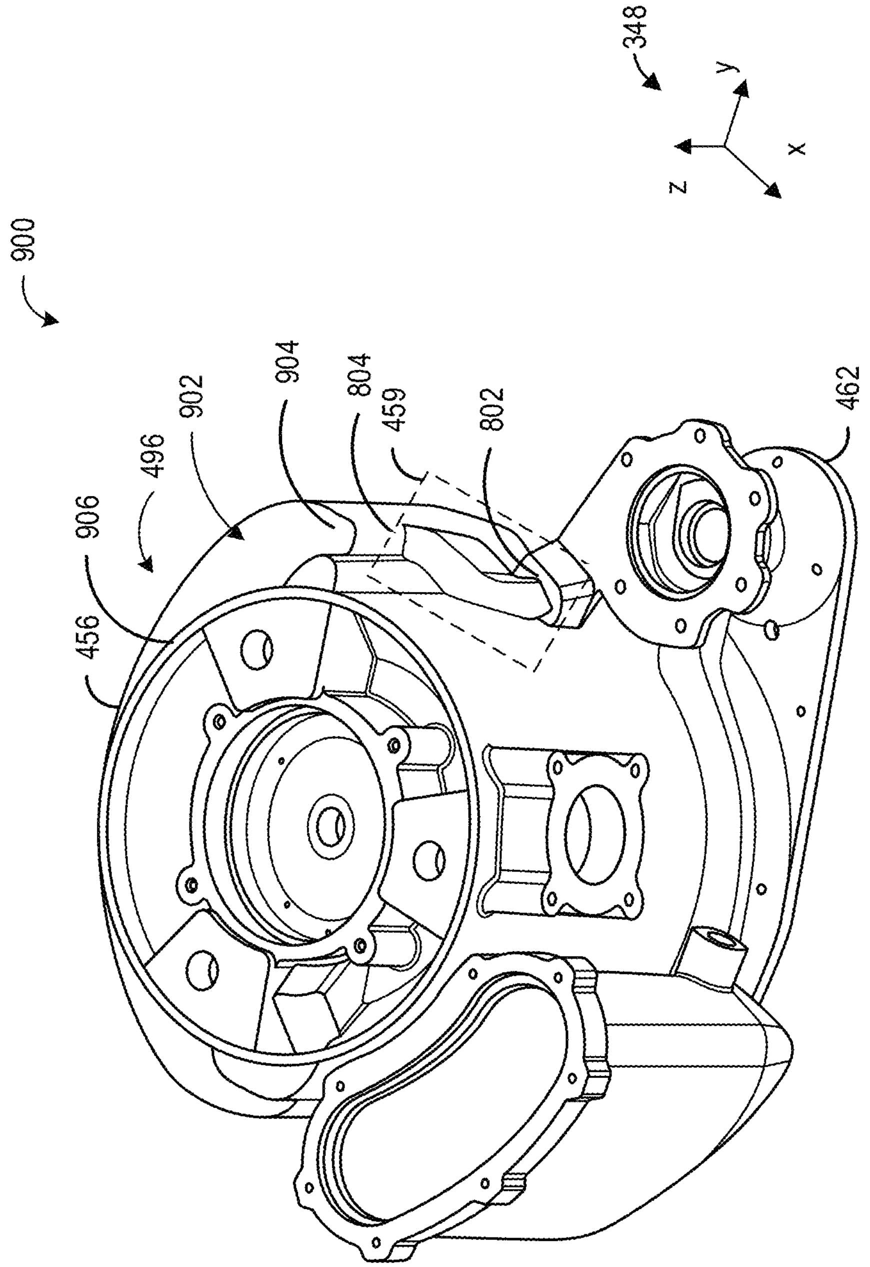
FIG. 9 shows a first perspective view of an exterior of the end-casing portion of the second X-ray tube assembly, in accordance with one or more embodiments of the present disclosure.
Figure 10:
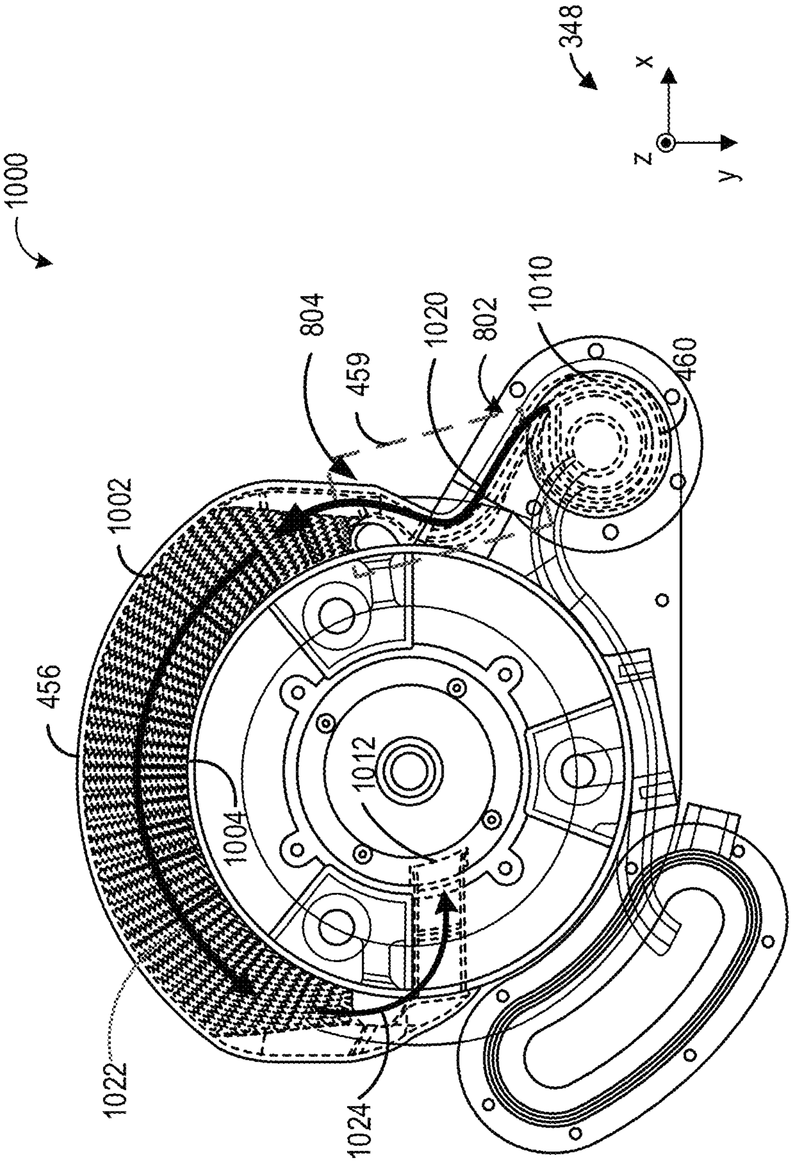
FIG. 10 shows a second perspective view of an interior of the end-casing portion of the second X-ray tube assembly, in accordance with one or more embodiments of the present disclosure.

FIG. 8 shows a side view 800 of the anode-side end-casing 456 of the second X-ray tube assembly 450. The side view 800 shows the second integrated oil channel 459, which extends from the pump housing 462. Specifically, the second integrated oil channel 459 extends from an outlet 802 of the pump (e.g., pump housing outlet 422), which is obscured in FIG. 8, to an inlet 804 of a heat exchanger (also obscured in FIG. 8), which may be arranged around an interior portion of the anode-side end-casing 456 as shown in FIGS. 9 and 10. The anode-side end-casing 456 may further include an aperture 814, through which a current may be applied to a stator of the X-ray tube assembly, to enable the stator to interact with and spin a shaft of the stator when the X-ray tube is operated. The anode-side end-casing portion 456 may further include a portion 810 which acts as housing for bellows (not shown in FIG. 8). Portion 810 may contain an aperture 812 which acts as an air vent channel connecting to an external surface of the bellows, which may be used to maintain a pressure of oil inside the Xray tube.

FIG. 9 shows a perspective view 900 of an exterior of the anode-side end-casing 456 of the second X-ray tube assembly 450. The perspective view 900 shows a full extent of the second integrated oil channel 459, extending from the pump outlet 802 of the pump housing 462 to the inlet 804 of the heat exchanger, which may be arranged around an interior circumference of the anode-side end-casing 456 at a location indicated by an arrow 902. Thus, oil may be directed from the pump to the heat exchanger via the second integrated oil channel 459, as shown by a dashed arrow 904. The oil may be further directed through the heat exchanger and around the interior circumference of the anode-side end-casing 456, in a circumferential direction shown by an arrow 906.

The path taken by the oil through the heat exchanger is more clearly depicted in FIG. 10. FIG. 10 shows a perspective view 1000 of an interior of the anode-side end-casing 456 of the second X-ray tube assembly 450. The perspective view 1000 shows the second integrated oil channel 459 extending from the outlet 802 of the pump housing 462 to the inlet 804 of a heat exchanger 1002 included along an inner circumferential surface 1004 of the anode-side end-casing 456. A first arrow 1020 shows a first flow of the oil from a volute 1010 of the pump 460 through the second integrated oil channel 459, corresponding to arrow 904 of FIG. 9. A second arrow 1022 shows a second flow of the oil circulating through the heat exchanger 1002, corresponding to the arrow 906 of FIG. 9. A third arrow 1024 shows a third flow of the oil out of the heat exchanger 1002 via an outlet 1012 into an interior space of the anode-side end-casing 456, where the oil may flow around components of the X-ray tube (e.g., components of the X-ray tube insert 520 shown in FIG. 5). Thus, as the oil is flowed around the components of the X-ray tube, heat generated in the X-ray tube may be extracted by the oil. As the oil is flowed through the heat exchanger, heat may be transferred from the oil to a coolant, such as water, of a separate coolant circuit (not shown in FIG. 10), thereby reducing a temperature of the oil and cooling the X-ray tube. The coolant may be circulated through an external cooling unit (not shown in FIG. 10), that cools the coolant prior to returning the coolant to the heat exchanger.

Figure 11:
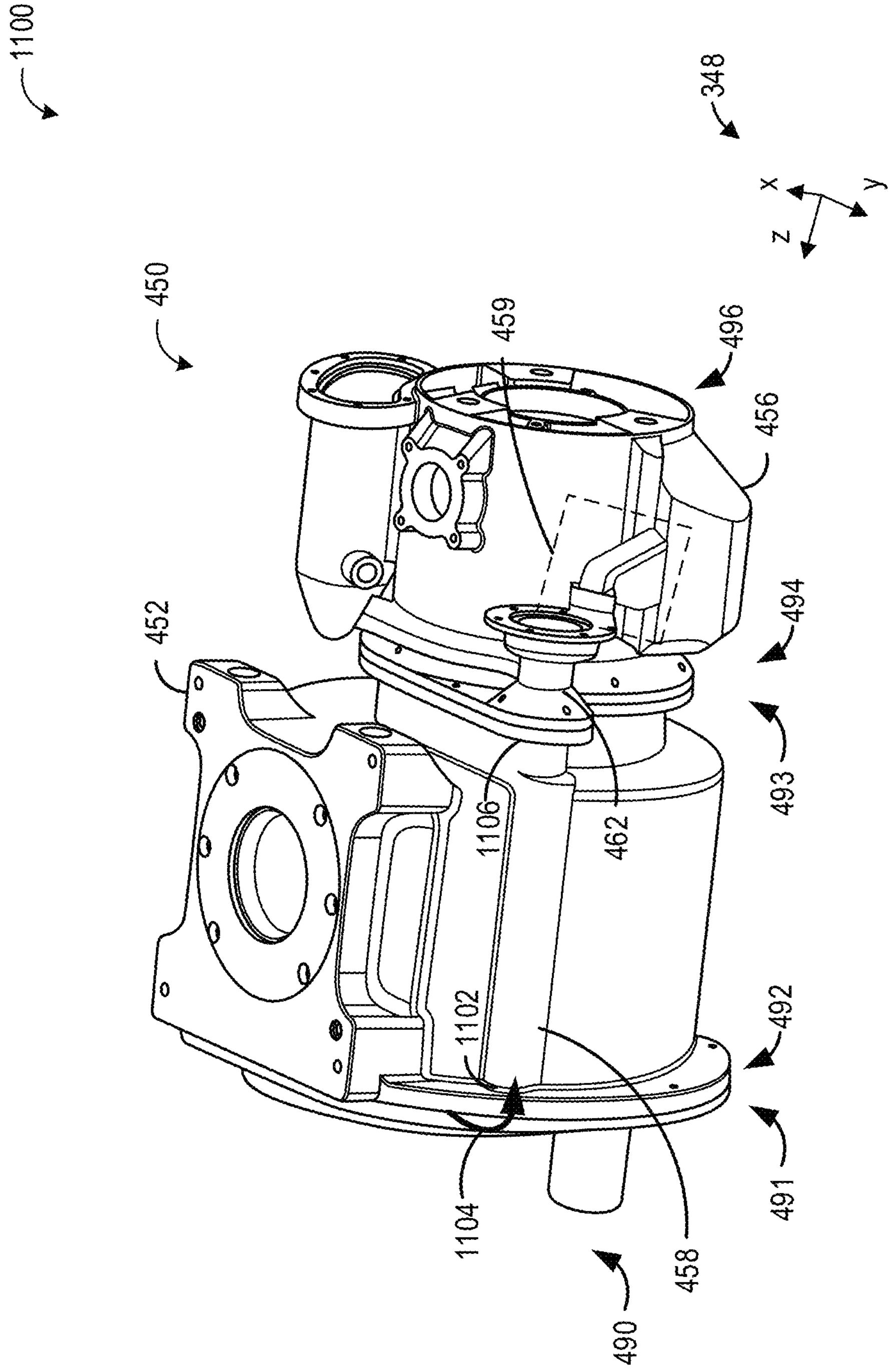
FIG. 11 shows a perspective view of a coupling of the mid-casing portion and the end-casing portion of the second X-ray tube assembly, in accordance with one or more embodiments of the present disclosure.

FIG. 11 shows a perspective view 1100 of the housing 451, which shows a coupling of mid-casing portion 452 to the anode-side end-casing 456 and the cathode-side end-casing portion 454 of the second X-ray tube assembly 450. The second side 491 of the cathode portion 454 may be bolted or welded to the first side 492 of the mid-casing portion 452, such that oil circulating around the X-ray insert within the mid-casing portion 452 may be directed into a first end 1102 of the first integrated oil channel 458, as shown by an arrow 1104. The second side 493 of the mid-casing portion 452 may be bolted or welded to the first side 494 of the anode-side end-casing 456, such that the oil is directed from a second end 1106 of the first integrated oil channel 458 into an inlet of the pump housing 462, as described above. The oil may subsequently be directed by the pump out of an outlet of the pump housing 462, and into the second integrated oil channel 459. The oil passes through the second integrated oil channel 459 into the heat exchanger located in the anode-side end-casing 456, as shown in FIG. 10.

Figure 12:
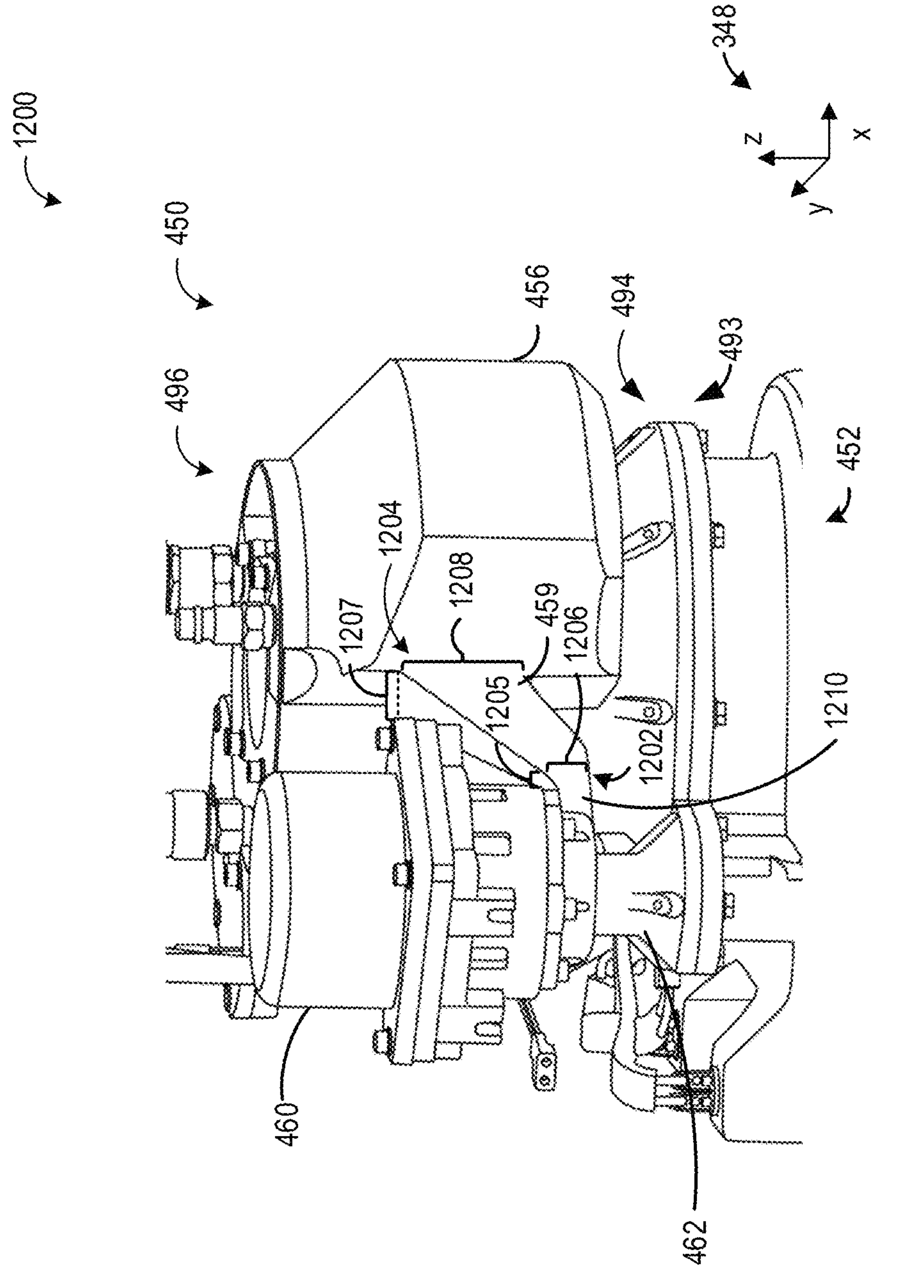
FIG. 12 shows a perspective view of an end-casing portion of the second X-ray tube assembly including an integrated coolant channel, in accordance with one or more embodiments of the present disclosure.

FIG. 12 shows a perspective view 1200 of the anode-side end-casing 456, and in particular, the second integrated oil channel 459. As described above, the second integrated oil channel 459 channels oil from the pump 460 to the heat exchanger positioned within the anode-side end-casing 456. The second integrated oil channel 459 has a first end 1202 proximate the pump 460, and a second end 1204 at an entrance to the heat exchanger. In contrast to the first integrated oil channel 458, the second integrated oil channel 459 may not be symmetrical between the first end 1202 and the second end 1204. Rather, one or more walls of the second integrated oil channel 459 may be angled, such that a cross-sectional area of the second integrated oil channel 459 may gradually increase between the first end 1202 and the second end 1204.

Specifically, the first end 1202 of the second integrated oil channel 459 may have a first cross-section, with a first height 1206 and a first width 1205. The second end 1204 of the second integrated oil channel 459 may have a second cross-section, with a second height 1208 and a second width 1207. As the oil is directed out of an outlet 1210 of the pump housing 462 and into the first end 1202 of the second integrated oil channel 459, the oil passes through a first area defined by the first cross-section. For example, the first height 1206 may be 10 mm, and the first width may be 10 mm, such that the first area may be a 10×10 mm area. As the oil flows through the second integrated oil channel 459 to the second end 1204, the cross-section of the second integrated oil channel 459 increases until achieving the second cross-section at the second end 1204. For example, the second height 1208 may be 30 mm, and the second width 1207 may be 10 mm, such that the second cross-section may be 30×10 mm. In one example, a length of the second integrated oil channel 459 from the first end 1202 to the second end 1204 may be 50 mm. By gradually increasing the height of the second integrated oil channel 459 at the second end 1204, a jetting of the oil as the oil enters the heat exchanger may be advantageously reduced, thereby ensuring uniform oil flow into the heat exchanger. In other words, in comparison with an alternative X-ray tube assembly including an integrated channel into the heat exchanger that does not include the gradual increase in the cross-section of the integrated channel, the X-ray tube assembly 450 may deliver hot oil to the heat exchanger in a more even and uniform manner, which may result in a greater transfer of heat from the oil to the coolant of the coolant circuit.

It should be appreciated that the example dimensions included herein are for illustrative and exemplary purposes, and in other embodiments, the dimensions of the second integrated oil channel 459 may be different without departing from the scope of this disclosure.

Thus, an X-ray tube housing with integrated oil channels is disclosed, where the integrated oil channels may direct a flow of oil through interior spaces of the X-ray tube housing to cool an X-ray tube enclosed by the X-ray tube housing. The disclosed X-ray tube housing may include a cathode-side end-casing portion, an anode-side end-casing portion, and a mid-casing portion coupled to the cathode-side end-casing portion at a first end and coupled to the anode-side end-casing portion at a second end of the mid-casing portion. A first oil channel directing the oil from the interior spaces to a pump housing inlet may be built into the mid-casing portion, and a second oil channel from a pump housing outlet to a heat exchanger located in the anode-side end-casing may be built into the anode-side end-casing. By integrating the oil channels into the respective casing portions of the X-ray tube housing, rather than using external hoses as in conventional X-ray tube housing designs, the X-ray tube assembly may be assembled with fewer parts, and a size, a complexity, and a manufacturing cost of the X-ray tube housing may be reduced. Because the oil channels are creating during a casting process of the casing portions, the oil channels may not degrade as quickly as the external hoses. Additionally, by eliminating the external hoses, a number of sealing joints may be reduced, which may reduce oil leaks of the X-ray tube housing. The technical effect of integrating oil channels into the housing of the X-ray tube assembly is that a size, a cost, and a maintenance of the X-ray tube assembly may be less than in conventional X-ray tube housing designs that rely on external hoses for directing oil throughout the X-ray tube assembly. As a result of the smaller size of the disclosed X-ray tube assembly, the X-ray tube assembly may be afforded closer and more flexible access to a patient, and may enable faster spin speeds and lower costs for a gantry on which the X-ray tube assembly is mounted.

The disclosure also provides support for an X-ray tube housing, comprising: a mid-casing portion, an anode-side end-casing portion, and a cathode-side end-casing portion, wherein: a first flow of oil circulating around an X-ray insert enclosed within the X-ray tube housing is directed to an inlet of a housing of a pump of the anode-side end-casing portion via a first oil channel integrated into the mid-casing portion, and a second flow of oil from an outlet of the pump housing is directed to a heat exchanger located in the anode-side end-casing portion via a second oil channel integrated into the anode-side end-casing portion. In a first example of the system, no external hoses used for circulating the oil are coupled to an exterior of the X-ray tube housing. In a second example of the system, optionally including the first example, walls of the first oil channel and the second oil channel are made with a heat-conducting metal. In a third example of the system, optionally including one or both of the first and second examples, the first oil channel is aligned parallel to a central axis of the mid-casing portion. In a fourth example of the system, optionally including one or more or each of the first through third examples, a first side of the anode-side end-casing portion is coupled to a second side of the mid-casing portion with the first oil channel linearly aligned with the pump housing inlet, such that oil flowing through the first oil channel directly enters the pump without changing a direction of a flow of the oil. In a fifth example of the system, optionally including one or more or each of the first through fourth examples, the first oil channel is integrated into the mid-casing portion such that a central axis of the first oil channel is aligned with a wall of the mid-casing portion, with a first circumferential portion of the first oil channel extending outward from an external surface of the mid-casing portion, and a second circumferential portion of the first oil channel extending inward from an internal surface of the mid-casing portion. In a sixth example of the system, optionally including one or more or each of the first through fifth examples, the first oil channel includes a first part and a second part, the first part having a first length corresponding to a first-diameter region of the mid-casing portion, and the second part having a second length corresponding to a second-diameter region of the mid-casing portion, the second-diameter region having a smaller diameter than the first-diameter region. In a seventh example of the system, optionally including one or more or each of the first through sixth examples, the first length is greater than the second length. In a eighth example of the system, optionally including one or more or each of the first through seventh examples, the first part leads from a space between the X-ray insert and the mid-casing portion to the second part, the second part leading from the first part to a coupling with the inlet of the pump housing. In a ninth example of the system, optionally including one or more or each of the first through eighth examples, the first part of the first oil channel has a first diameter, and the second part of the first oil channel has a second diameter, the second diameter greater than the first diameter. In a tenth example of the system, optionally including one or more or each of the first through ninth examples, a portion of an interior surface of the first oil channel is formed by a backup plate of the X-ray tube housing. In a eleventh example of the system, optionally including one or more or each of the first through tenth examples, the first oil channel is formed by casting and not by additive manufacturing. In a twelfth example of the system, optionally including one or more or each of the first through eleventh examples, the second oil channel is integrated into the anode-side end-casing portion, with a first end of the second oil channel coupled to the outlet of the pump housing and a second end of the second oil channel coupled to the heat exchanger, such that the second flow of oil is directed from the outlet of the pump housing to the heat exchanger. In a thirteenth example of the system, optionally including one or more or each of the first through twelfth examples, one or more walls of the second oil channel are angled such that the first end of the second oil channel has a first cross-sectional area, and the second end of the second oil channel has a second, greater cross-sectional area, and a size of the second oil channel gradually increases between the first end and the second end.

The disclosure also provides support for a method for cooling a dielectric oil disposed within an X-ray tube assembly, the method comprising: manufacturing a mid-casing portion of a housing of the X-ray tube assembly that includes a first oil channel integrated into a first wall of the mid-casing portion, manufacturing an anode-side end-casing portion of the housing that includes a second oil channel integrated into second wall of the anode-side end-casing portion, placing an amount of the dielectric oil in a space between the housing and an X-ray insert of the X-ray tube assembly, circulating a flow of the dielectric oil between the space and a heat exchanger of the X-ray tube assembly via the first oil channel and the second oil channel, using a pump of the X-ray tube assembly. In a first example of the method, one or more walls of the second oil channel are angled such that a first end of the second oil channel at an outlet of the pump has a first cross-sectional area, and a second end of the second oil channel at the heat exchanger has a second, greater cross-sectional area, and a size of the second oil channel gradually increases between the first end and the second end. In a second example of the method, optionally including the first example, the mid-casing portion includes a first-diameter region having a first diameter, and a second-diameter region having a second, smaller diameter, and first oil channel is integrated into the mid-casing portion such that a central axis of the first oil channel is aligned parallel to a central axis of the mid-casing portion, the first oil channel including a first part and a second part, the first part having a first length corresponding to the first-diameter region, and the second part having a second, shorter length corresponding to the second-diameter region, the first part of the first oil channel having a first diameter, and the second part of the first oil channel having a second diameter, the second diameter greater than the first diameter.

The disclosure also provides support for an X-ray tube housing, comprising: an anode-side end-casing portion manufactured using an additive manufacturing process, a cathode-side end-casing portion manufactured using the additive manufacturing process, and a mid-casing portion manufactured using a casting process, wherein the mid-casing portion is configured to include a first oil channel integrated into the mid-casing portion, the first oil channel connecting an interior space of the X-ray tube housing to a pump inlet portion of the anode-side end-casing portion, and the anode-side end-casing portion is configured to include a second oil channel integrated into the anode-side end-casing portion, the second oil channel connecting a pump outlet portion of the anode-side end-casing portion with an inlet to a heat exchanger positioned in the anode-side end-casing portion. In a first example of the system, one or more walls of the second oil channel are angled such that a first end of the second oil channel at an outlet of the pump has a first cross-sectional area, and a second end of the second oil channel at the heat exchanger has a second, greater cross-sectional area, and a size of the second oil channel gradually increases between the first end and the second end. In a second example of the system, optionally including the first example, the mid-casing portion includes a first-diameter region having a first diameter, and a second-diameter region having a second, smaller diameter, and first oil channel is integrated into the mid-casing portion such that a central axis of the first oil channel is aligned parallel to a central axis of the mid-casing portion, the first oil channel including a first part and a second part, the first part having a first length corresponding to the first-diameter region, and the second part having a second, shorter length corresponding to the second-diameter region, the first part of the first oil channel having a first diameter, and the second part of the first oil channel having a second diameter, the second diameter greater than the first diameter.

FIGS. 4A-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising,"

"including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. An X-ray tube housing, comprising:

a mid-casing portion, an anode-side end-casing portion, and a cathode-side end-casing portion, wherein:

a first flow of oil circulating around an X-ray insert enclosed within the X-ray tube housing is directed to an inlet of a housing of a pump of the anode-side end-casing portion via a first oil channel integrated into the mid-casing portion; and a second flow of oil from an outlet of the pump housing is directed to a heat exchanger located in the anode-side end-casing portion via a second oil channel integrated into the anode-side end-casing portion;

wherein the first oil channel is integrated into the mid-casing portion such that a central axis of the first oil channel is aligned with a wall of the mid-casing portion, with a first circumferential portion of the first oil channel extending outward from an external surface of the mid-casing portion, and a second circumferential portion of the first oil channel extending inward from an internal surface of the mid-casing portion.

2. The X-ray tube housing of claim 1, wherein the first oil channel is integrated into the mid-casing portion and the second oil channel is integrated into the anode-side end-casing portion in such a way that no external hoses are relied on for circulating the oil.

3. The X-ray tube housing of claim 1, wherein walls of the first oil channel and the second oil channel are made with a heat-conducting metal.

4. The X-ray tube housing of claim 1, wherein the first oil channel is aligned parallel to a central axis of the mid-casing portion.

5. The X-ray tube housing of claim 4, wherein a first side of the anode-side end-casing portion is coupled to a second side of the mid-casing portion with the first oil channel linearly aligned with the pump housing inlet, such that oil flowing through the first oil channel directly enters the pump without changing a direction of a flow of the oil.

6. The X-ray tube housing of claim 1, wherein the first oil channel includes a first part and a second part, the first part having a first length corresponding to a first-diameter region of the mid-casing portion, and the second part having a second length corresponding to a second-diameter region of the mid-casing portion, the second-diameter region having a smaller diameter than the first-diameter region.

7. The X-ray tube housing of claim 6, wherein the first length is greater than the second length.

8. The X-ray tube housing of claim 6, wherein the first part leads from a space between the X-ray insert and the mid-casing portion to the second part, the second part leading from the first part to a coupling with the inlet of the pump housing.

9. The X-ray tube housing of claim 8, wherein the first part of the first oil channel has a first diameter, and the second part of the first oil channel has a second diameter, the second diameter greater than the first diameter.

10. The X-ray tube housing of claim 1, wherein a portion of an interior surface of the first oil channel is formed by a backup plate of the X-ray tube housing.

11. The X-ray tube housing of claim 1, wherein the first oil channel is formed by casting and not by additive manufacturing.

12. The X-ray tube housing of claim 1, wherein the second oil channel is integrated into the anode-side end-casing portion, with a first end of the second oil channel coupled to the outlet of the pump housing and a second end of the second oil channel coupled to the heat exchanger, such that the second flow of oil is directed from the outlet of the pump housing to the heat exchanger.

13. The X-ray tube housing of claim 12, wherein one or more walls of the second oil channel are angled such that the first end of the second oil channel has a first cross-sectional area, and the second end of the second oil channel has a second, greater cross-sectional area, and a size of the second oil channel gradually increases between the first end and the second end.

14. A method for cooling a dielectric oil disposed within an X-ray tube assembly, the method comprising:

manufacturing a mid-casing portion of a housing of the X-ray tube assembly that includes a first oil channel integrated into a first wall of the mid-casing portion;

manufacturing an anode-side end-casing portion of the housing that includes a second oil channel integrated into second wall of the anode-side end-casing portion;

placing an amount of the dielectric oil in a space between the housing and an X-ray insert of the X-ray tube assembly;

circulating a flow of the dielectric oil between the space and a heat exchanger of the X-ray tube assembly via the first oil channel and the second oil channel, using a pump of the X-ray tube assembly;

wherein the first oil channel is integrated into the mid-casing portion such that a central axis of the first oil channel is aligned with a wall of the mid-casing portion, with a first circumferential portion of the first oil channel extending outward from an external surface of the mid-casing portion, and a second circumferential portion of the first oil channel extending inward from an internal surface of the mid-casing portion.

15. The method of claim 14, wherein one or more walls of the second oil channel are angled such that a first end of the second oil channel at an outlet of the pump has a first cross-sectional area, and a second end of the second oil channel at the heat exchanger has a second, greater cross-sectional area, and a size of the second oil channel gradually increases between the first end and the second end.

16. The method of claim 14, wherein the mid-casing portion includes a first-diameter region having a first diameter, and a second-diameter region having a second, smaller diameter, and first oil channel is integrated into the mid-casing portion such that a central axis of the first oil channel is aligned parallel to a central axis of the mid-casing portion, the first oil channel including a first part and a second part, the first part having a first length corresponding to the first-diameter region, and the second part having a second, shorter length corresponding to the second-diameter region, the first part of the first oil channel having a first diameter, and the second part of the first oil channel having a second diameter, the second diameter greater than the first diameter.

17. An X-ray tube housing, comprising:

an anode-side end-casing portion;

a cathode-side end-casing portion; and a mid-casing portion;

wherein the mid-casing portion is configured to include a first oil channel integrated into the mid-casing portion, the first oil channel connecting an interior space of the X-ray tube housing to a pump inlet portion of the anode-side end-casing portion; and the anode-side end-casing portion is configured to include a second oil channel integrated into the anode-side end-casing portion, the second oil channel connecting a pump outlet portion of the anode-side end-casing portion with an inlet to a heat exchanger positioned in the anode-side end-casing portion;

wherein the first oil channel is integrated into the mid-casing portion such that a central axis of the first oil channel is aligned with a wall of the mid-casing portion, with a first circumferential portion of the first oil channel extending outward from an external surface of the mid-casing portion, and a second circumferential portion of the first oil channel extending inward from an internal surface of the mid-casing portion.

18. The X-ray tube housing of claim 17, wherein one or more walls of the second oil channel are angled such that a first end of the second oil channel at an outlet of the pump has a first cross-sectional area, and a second end of the second oil channel at the heat exchanger has a second, greater cross-sectional area, and a size of the second oil channel gradually increases between the first end and the second end.

19. The X-ray tube housing of claim 17, wherein the mid-casing portion includes a first-diameter region having a first diameter, and a second-diameter region having a second, smaller diameter, and first oil channel is integrated into the mid-casing portion such that a central axis of the first oil channel is aligned parallel to a central axis of the mid-casing portion, the first oil channel including a first part and a second part, the first part having a first length corresponding to the first-diameter region, and the second part having a second, shorter length corresponding to the second-diameter region, the first part of the first oil channel having a first diameter, and the second part of the first oil channel having a second diameter, the second diameter greater than the first diameter.

* * * * *